US008190852B2

(12) United States Patent
Honda et al.

(10) Patent No.: US 8,190,852 B2
(45) Date of Patent: May 29, 2012

(54) VIRTUALIZATION CONTROLLER AND DATA TRANSFER CONTROL METHOD

(75) Inventors: Kiyoshi Honda, Yokohama (JP); Naoko Iwami, Sagamihara (JP); Kazuyoshi Serizawa, Machida (JP)

(73) Assignee: Hitachi, Ltd., Tokyo (JP)

( * ) Notice: Subject to any disclaimer, the term of this patent is extended or adjusted under 35 U.S.C. 154(b) by 505 days.

(21) Appl. No.: 11/723,229

(22) Filed: Mar. 19, 2007

(65) Prior Publication Data

US 2007/0192558 A1  Aug. 16, 2007

Related U.S. Application Data

(63) Continuation of application No. 10/663,480, filed on Sep. 15, 2003, now Pat. No. 7,263,593.

(30) Foreign Application Priority Data

Nov. 25, 2002  (JP) .................................. 2002-340276

(51) Int. Cl.
*G06F 12/00* (2006.01)
(52) U.S. Cl. .. 711/205; 711/114; 711/165; 711/E12.027
(58) Field of Classification Search .......................... None
See application file for complete search history.

(56) References Cited

U.S. PATENT DOCUMENTS

| | | | |
|---|---|---|---|
| 3,771,137 A | 11/1973 | Barner et al. | |
| 4,025,904 A | 5/1977 | Adney et al. | |
| 4,710,868 A | 12/1987 | Cocke et al. | |
| 5,155,845 A | 10/1992 | Beal et al. | |
| 5,408,465 A | 4/1995 | Gusella et al. | |
| 5,459,857 A | 10/1995 | Ludlam et al. | |
| 5,504,882 A | 4/1996 | Chai et al. | |
| 5,548,712 A | 8/1996 | Larson et al. | ..................... 714/7 |
| 5,574,950 A | 11/1996 | Hathorn et al. | |
| 5,680,580 A | 10/1997 | Beardsley et al. | |
| 5,680,640 A | 10/1997 | Ofek et al. | ..................... 710/19 |

(Continued)

FOREIGN PATENT DOCUMENTS

EP   0670551   9/1995

(Continued)

OTHER PUBLICATIONS

White Paper, "Network Attached Storage in the Data Protection Environment", Sony Electronics Inc., Feb. 2002, pp. 1-23.

(Continued)

*Primary Examiner* — Reginald Bragdon
*Assistant Examiner* — Daniel Bernard
(74) *Attorney, Agent, or Firm* — Mattingly & Malur, PC

(57) ABSTRACT

System for controlling data transfer between a host system and storage devices. A virtualization controller implements the data transfer and includes first ports for connection with the storage devices, a second port for connection with the host system, a processor, and a memory configured to store volume mapping information which correlates first identification information used by the host system to access a first storage area in one of the storage devices, with second identification information for identifying the first storage area, the correlation being used by the processor to access the first storage area. When data stored in the first storage area is transferred to a second storage area, the processor correlates the first identification information with a third identification information for identifying the second storage area and registers the first identification information and the third identification information in the volume mapping information.

18 Claims, 23 Drawing Sheets

U.S. PATENT DOCUMENTS

| | | | |
|---|---|---|---|
| 5,758,118 A | 5/1998 | Choy et al. ............... 711/114 |
| 5,809,285 A | 9/1998 | Hilland |
| 5,835,954 A | 11/1998 | Duyanovich et al. ......... 711/162 |
| 5,870,537 A | 2/1999 | Kern et al. |
| 5,895,485 A | 4/1999 | Loechel et al. |
| 5,917,723 A | 6/1999 | Binford |
| 5,956,750 A | 9/1999 | Yamamoto et al. |
| 5,978,890 A | 11/1999 | Ozawa et al. |
| 6,012,123 A | 1/2000 | Pecone et al. |
| 6,044,444 A | 3/2000 | Ofek |
| 6,058,451 A * | 5/2000 | Bermingham et al. ....... 711/106 |
| 6,098,129 A | 8/2000 | Fukuzawa et al. |
| 6,101,497 A | 8/2000 | Ofek |
| 6,108,748 A | 8/2000 | Ofek et al. ................... 711/112 |
| 6,173,374 B1 | 1/2001 | Heil et al. |
| 6,195,730 B1 | 2/2001 | West |
| 6,209,002 B1 | 3/2001 | Gagne et al. |
| 6,216,202 B1 * | 4/2001 | D'Errico ....................... 711/112 |
| 6,219,753 B1 | 4/2001 | Richardson |
| 6,230,239 B1 | 5/2001 | Sakaki et al. ................ 711/112 |
| 6,240,486 B1 | 5/2001 | Ofek et al. ................... 711/112 |
| 6,240,494 B1 | 5/2001 | Nagasawa et al. |
| 6,247,099 B1 | 6/2001 | Skazinski et al. |
| 6,247,103 B1 | 6/2001 | Kern et al. |
| RE37,305 E | 7/2001 | Chang et al. |
| 6,341,329 B1 | 1/2002 | LeCrone et al. |
| 6,356,977 B2 | 3/2002 | Ofek et al. |
| 6,363,462 B1 | 3/2002 | Bergsten et al. |
| 6,374,327 B2 | 4/2002 | Sakaki et al. |
| 6,446,141 B1 | 9/2002 | Nolan et al. |
| 6,446,175 B1 | 9/2002 | West et al. |
| 6,453,354 B1 | 9/2002 | Jiang et al. |
| 6,457,109 B1 | 9/2002 | Milillo et al. |
| 6,457,139 B1 | 9/2002 | D3 Errico et al. ................. 714/5 |
| 6,480,934 B1 | 11/2002 | Hino et al. |
| 6,484,173 B1 | 11/2002 | O'Hare et al. |
| 6,490,659 B1 | 12/2002 | McKean et al. |
| 6,523,096 B2 | 2/2003 | Sanada et al. |
| 6,529,976 B1 | 3/2003 | Fukuzawa et al. |
| 6,542,961 B1 | 4/2003 | Matsunami et al. |
| 6,553,408 B1 | 4/2003 | Merrell et al. |
| 6,560,673 B2 | 5/2003 | Elliott |
| 6,587,935 B2 | 7/2003 | Ofek |
| 6,598,134 B2 | 7/2003 | Ofek et al. |
| 6,622,220 B2 | 9/2003 | Yoshida et al. |
| 6,640,278 B1 | 10/2003 | Nolan et al. |
| 6,640,291 B2 | 10/2003 | Fujibayashi et al. .......... 711/162 |
| 6,647,387 B1 | 11/2003 | McKean et al. |
| 6,647,474 B2 | 11/2003 | Yanai et al. |
| 6,647,476 B2 | 11/2003 | Nagasawa et al. |
| 6,654,830 B1 | 11/2003 | Taylor et al. |
| 6,654,831 B1 | 11/2003 | Otterness et al. |
| 6,675,258 B1 | 1/2004 | Bramhall et al. |
| 6,675,268 B1 | 1/2004 | DeKoning et al. |
| 6,681,303 B1 | 1/2004 | Watanabe et al. |
| 6,681,339 B2 | 1/2004 | McKean et al. |
| 6,684,310 B2 | 1/2004 | Anzai et al. |
| 6,687,758 B2 | 2/2004 | Craft et al. ................... 709/250 |
| 6,697,367 B1 | 2/2004 | Halstead et al. |
| 6,708,232 B2 | 3/2004 | Obara |
| 6,718,404 B2 | 4/2004 | Reuter et al. |
| 6,745,281 B1 | 6/2004 | Saegusa |
| 6,772,315 B1 | 8/2004 | Perego |
| 6,799,255 B1 | 9/2004 | Blumenau et al. |
| 6,816,948 B2 | 11/2004 | Kitamura et al. ............. 711/152 |
| 6,826,778 B2 | 11/2004 | Bopardikar et al. ........... 725/145 |
| 6,851,020 B2 | 2/2005 | Matsumoto et al. |
| 6,857,057 B2 | 2/2005 | Nelson et al. |
| 6,876,656 B2 | 4/2005 | Brewer et al. |
| 6,883,064 B2 | 4/2005 | Yoshida et al. |
| 6,922,761 B2 | 7/2005 | O'Connell et al. |
| 6,973,549 B1 | 12/2005 | Testardi |
| 6,976,103 B1 | 12/2005 | Watanabe et al. |
| 6,976,134 B1 | 12/2005 | Lolayekar et al. |
| 7,051,121 B2 | 5/2006 | Ohno et al. |
| 7,054,893 B2 | 5/2006 | Mogi et al. |
| 7,263,593 B2 | 8/2007 | Honda et al. |
| 2001/0000818 A1 | 5/2001 | Nagasawa et al. |
| 2001/0050915 A1 | 12/2001 | O'Hare et al. |
| 2001/0052018 A1 | 12/2001 | Yokokura |
| 2001/0054133 A1 | 12/2001 | Murotani et al. |
| 2002/0003022 A1 | 1/2002 | Csida et al. |
| 2002/0004857 A1 | 1/2002 | Arakawa et al. |
| 2002/0004890 A1 | 1/2002 | Ofek et al. ................... 711/161 |
| 2002/0019908 A1 | 2/2002 | Reuter et al. |
| 2002/0019920 A1 | 2/2002 | Reuter et al. |
| 2002/0019922 A1 | 2/2002 | Reuter et al. |
| 2002/0019923 A1 | 2/2002 | Reuter et al. |
| 2002/0026558 A1 | 2/2002 | Reuter et al. |
| 2002/0029326 A1 | 3/2002 | Reuter et al. |
| 2002/0032825 A1 * | 3/2002 | Saze et al. ................... 710/300 |
| 2002/0065864 A1 | 5/2002 | Hartsell et al. |
| 2002/0087544 A1 | 7/2002 | Selkirk et al. |
| 2002/0087751 A1 | 7/2002 | Chong |
| 2002/0103889 A1 | 8/2002 | Markson et al. |
| 2002/0112113 A1 | 8/2002 | Karpoff et al. |
| 2002/0124108 A1 | 9/2002 | Terrell et al. |
| 2002/0133735 A1 | 9/2002 | McKean et al. |
| 2002/0156887 A1 | 10/2002 | Hashimoto |
| 2002/0156984 A1 | 10/2002 | Padovano |
| 2002/0156987 A1 | 10/2002 | Gajjar et al. |
| 2002/0178328 A1 | 11/2002 | Honda et al. |
| 2002/0178335 A1 | 11/2002 | Selkirk et al. |
| 2002/0188592 A1 | 12/2002 | Leonhardt et al. |
| 2002/0194428 A1 | 12/2002 | Green |
| 2002/0194523 A1 | 12/2002 | Ulrich et al. ....................... 714/4 |
| 2003/0037071 A1 | 2/2003 | Harris et al. |
| 2003/0051109 A1 | 3/2003 | Cochran |
| 2003/0056038 A1 | 3/2003 | Cochran |
| 2003/0079018 A1 | 4/2003 | Lolayekar et al. |
| 2003/0079019 A1 | 4/2003 | Lolayekar et al. |
| 2003/0093439 A1 | 5/2003 | Mogi et al. |
| 2003/0093541 A1 | 5/2003 | Lolayekar et al. |
| 2003/0093567 A1 | 5/2003 | Lolayekar et al. |
| 2003/0097607 A1 | 5/2003 | Bessire |
| 2003/0101228 A1 | 5/2003 | Busser et al. |
| 2003/0105931 A1 | 6/2003 | Weber et al. |
| 2003/0115218 A1 | 6/2003 | Bobbitt et al. |
| 2003/0115432 A1 | 6/2003 | Biessener et al. |
| 2003/0126327 A1 | 7/2003 | Pesola et al. |
| 2003/0126388 A1 | 7/2003 | Yamagami |
| 2003/0145168 A1 | 7/2003 | LeCrone et al. |
| 2003/0145169 A1 | 7/2003 | Nagasawa et al. ........... 711/117 |
| 2003/0158999 A1 | 8/2003 | Hauck et al. |
| 2003/0163553 A1 | 8/2003 | Kitamura et al. |
| 2003/0167419 A1 | 9/2003 | Yanai et al. |
| 2003/0182525 A1 | 9/2003 | O'Connell et al. ........... 711/162 |
| 2003/0189936 A1 | 10/2003 | Terrell et al. |
| 2003/0200387 A1 | 10/2003 | Urabe et al. |
| 2003/0204597 A1 | 10/2003 | Arakawa et al. |
| 2003/0204700 A1 | 10/2003 | Biessener et al. |
| 2003/0212854 A1 | 11/2003 | Kitamura et al. |
| 2003/0212860 A1 | 11/2003 | Jiang et al. |
| 2003/0221077 A1 | 11/2003 | Ohno et al. |
| 2003/0229645 A1 | 12/2003 | Mogi et al. |
| 2003/0229764 A1 | 12/2003 | Ohno et al. |
| 2003/0237019 A1 | 12/2003 | Kleiman et al. ................... 714/6 |
| 2004/0003022 A1 | 1/2004 | Garrison et al. |
| 2004/0028043 A1 | 2/2004 | Maveli et al. |
| 2004/0049553 A1 | 3/2004 | Iwamura et al. |
| 2004/0054850 A1 | 3/2004 | Fisk |
| 2004/0054866 A1 | 3/2004 | Blumenau et al. |
| 2004/0064610 A1 | 4/2004 | Fukuzawa et al. |
| 2004/0064641 A1 | 4/2004 | Kodama |
| 2004/0068637 A1 | 4/2004 | Nelson et al. |
| 2004/0088417 A1 | 5/2004 | Bober et al. |
| 2004/0098547 A1 | 5/2004 | Ofek et al. |
| 2004/0111485 A1 | 6/2004 | Mimatsu et al. |
| 2004/0123180 A1 | 6/2004 | Soejima et al. |
| 2004/0139237 A1 | 7/2004 | Rangan et al. |
| 2004/0143832 A1 | 7/2004 | Yamamoto et al. |
| 2004/0148443 A1 | 7/2004 | Achiwa et al. |
| 2004/0158652 A1 | 8/2004 | Obara |
| 2004/0158673 A1 | 8/2004 | Matsunami et al. |
| 2004/0172510 A1 | 9/2004 | Nagashima et al. |
| 2004/0230980 A1 | 11/2004 | Koyama et al. |
| 2004/0260875 A1 | 12/2004 | Murotani et al. |

| | | | |
|---|---|---|---|
| 2004/0260966 A1 | 12/2004 | Kaiya et al. | |
| 2005/0010734 A1 | 1/2005 | Soejima et al. | 711/163 |
| 2005/0010743 A1 | 1/2005 | Tremblay et al. | |
| 2005/0033878 A1 | 2/2005 | Pangal et al. | |
| 2005/0055501 A1 | 3/2005 | Guha et al. | |
| 2005/0081009 A1 | 4/2005 | Williams et al. | 711/163 |
| 2005/0138184 A1 | 6/2005 | Amir | |
| 2005/0240741 A1 | 10/2005 | Nagasawa et al. | |
| 2005/0289299 A1* | 12/2005 | Nunamaker et al. | 711/122 |

FOREIGN PATENT DOCUMENTS

| | | |
|---|---|---|
| EP | 1130514 A2 * | 9/2001 |
| EP | 1130514 A2 | 9/2001 |
| JP | 09288547 | 11/1997 |
| JP | 10283272 | 10/1998 |
| JP | 11065980 | 3/1999 |
| JP | 11-184641 | 7/1999 |
| JP | 2000163329 | 6/2000 |
| JP | 2000242434 | 9/2000 |
| JP | 2000293317 | 10/2000 |
| JP | 2001067187 | 3/2001 |
| JP | 2001249853 | 9/2001 |
| JP | 2001331355 | 11/2001 |
| JP | 2002157091 | 5/2002 |
| JP | 2002230246 | 8/2002 |
| JP | 2003150414 | 5/2003 |
| WO | 97/09676 | 3/1997 |
| WO | 03/023640 | 3/2003 |
| WO | 03027886 | 4/2003 |
| WO | 03030431 | 4/2003 |
| WO | 03030449 | 4/2003 |
| WO | 03/060688 A2 | 7/2003 |

OTHER PUBLICATIONS

S. Sicola, "SCSI-3 Fault Tolerant Controller Configurations Utilizing SCC & New Event Codes", High Availability Study Group, Doc. No. X3T10 95-312r3, Rev. 3.0, Feb. 28, 1996, pp. 1-4.

"SANRAD Application Note: Migrating Individual Servers to an iSCSI SAN", APP-004-01 SANRAD 2003, pp. 1-15.

"White Paper—Celerra Data Migration Service (CDMS)", EMC Corporation, Jan. 2002, pp. 1-13.

P. Sarkar, et al "Internet Protocol Storage Area Networks", IBM Systems, Journal, vol. 4 2003, pp. 218-231.

E. Anderson, et al, "Hippodrome: Running Circles Around Storage Administration", Hewlett-Packard Laboratories, pp. 14.

SANRAD Application Note: Data Migration Solution Transferring Data Between Storage Systems Over Fibre-Channel or SCSI Connections, APP-003-03, SANRAD 2003, pp. 1-9.

Meggyesi "Fibre Channel Overview", High Speed Interconnect Project European Laboratory of Particle Physics (CERN) web page http://hsi.web.cern.ch (Aug. 1994).

"SAN Virtualization Guidelines", DataCore Software Corporation, 2000 pp. 1-9.

"Introduction to Storage Pooling, Consolidation Storage Resources with Datacore SANsymphony Software", White Paper, DataCore Software, Jul. 2003, 8 pages.

* cited by examiner

| Virtual Volume Management Information | | | | | Real Volume Management Information | | | | |
|---|---|---|---|---|---|---|---|---|---|
| Port ID | Port Name | LUN | Size | Status | Port ID | Port Name | LUN | Size | Status |
| V_Pid_1 | V_Pname_1 | 0 | 10 GB | Active | P_Pid_1 | P_Pname_1 | 0 | 10 GB | Active |
| V_Pid_2 | V_Pname_2 | 0 | 5 GB | Active | P_Pid_2 | P_Pname_2 | 0 | 5 GB | Active |
| | | 1 | 5 GB | Active | P_Pid_1 | P_Pname_1 | 1 | 5 GB | Active |
| - | - | - | - | - | - | - | - | - | - |

FIG.5

| Port ID | Port Name | Node Name | LUN | Size |
|---|---|---|---|---|
| P_Pid_1 | P_Pname_1 | P_Nname_1 | 0 | 10 GB |
|  |  |  | 1 | 5 GB |
| P_Pid_2 | P_Pname_2 | P_Nname_2 | 0 | 5 GB |
| P_Pid_3 | P_Pname_3 | P_Nname_3 | 1 | 10 GB |
| - | - | - | - | - |

512

| Virtual Volume Management Information 515 | | | | | Real Volume Management Information 521 | | | | | |
|---|---|---|---|---|---|---|---|---|---|---|
| Port ID | Port Name | LUN | Size | Status | Port ID | Port Name | LUN | Size | Status | Command |
| V_Pid_1 | V_Pname_1 | 0 | 10 GB | Inactive | P_Pid_1 | P_Pname_1 | 0 | 10 GB | Active | C_id_0
C_id_1
C_id_2 |
|  |  | 0 | 10 GB | Active | P_Pid_3 | P_Pname_3 | 1 | 10 GB | Active | C_id_3
C_id_4 |
| - | - | - | - | - | - | - | - | - | - | - |

Virtual Volume Management Information 520

| Port ID | Port Name | LUN | Personal | Size | Status |
|---------|-----------|-----|----------|-------|----------|
| V_Pid_1 | V_Pname_1 | 0 | AAA_01 | 10 GB | Active |
| | | 0 | AAA_01 | 10 GB | Inactive |
| | | 0 | DDD_01 | 5 GB | Active |
| V_Pid_2 | V_Pname_2 | 1 | AAA_00 | 5 GB | Active |
| - | - | - | - | - | - |

Real Volume Management Information 521

| Port ID | Port Name | LUN | Personal | Size | Status | Command |
|---------|-----------|-----|----------|-------|--------|---------|
| P_Pid_3 | P_Pname_3 | 0 | CCC_01 | 10 GB | Active | C_id_3 |
| P_Pid_1 | P_Pname_1 | 0 | AAA_01 | 10 GB | Active | C_id_0 |
| P_Pid_2 | P_Pname_2 | 0 | BBB_01 | 5 GB | Active | - |
| P_Pid_1 | P_Pname_1 | 1 | AAA_00 | 5 GB | Active | - |
| - | - | - | - | - | - | - |

FIG.15

| Virtual Volume Management Information | | | | | | |
|---|---|---|---|---|---|---|
| Port ID | Port Name | LUN | Personal | Size | Status | Address |
| V_Pid_3 | V_Pname_3 | 0 | AAA_02 | 10 GB | Active | 0h ~ 98967Fh |
| | | | | | | 989680h ~ 1312CFFh |
| - | - | - | - | - | - | - |

515 / 520

| Real Volume Management Information | | | | | | |
|---|---|---|---|---|---|---|
| Port ID | Port Name | LUN | Personal | Size | Status | Command |
| P_Pid_1 | P_Pname_1 | 3 | AAA_02 | 5 GB | Active | C_id_6 |
| P_Pid_2 | P_Pname_2 | 1 | BBB_01 | 5 GB | Active | C_id_7 |
| - | - | - | - | - | - | - |

| Volume | Personality | Connection (P) | Connection (S) | Status |
|---|---|---|---|---|
| 0 | AAA_01 | Hid_1 - P_Pid_1 | Hid_2 - P_Pid_2 | Active |
| 1 | AAA_02 | Hid_2 - P_Pid_2 | Hid_1 - P_Pid_1 | Active |

FIG.22

| Virtual Volume Management Information (520) | | | Real Volume Management Information (521) | | | Virtualization Module Management Information (523) | External Volume Connection Module Management Information (524) |
|---|---|---|---|---|---|---|---|
| Port ID | Port Name | LUN | Port ID | Port Name | LUN | | |
| V_Pid_1 | V_Pname_1 | 0 | - | - | - | Storage Control part #1 | - |
| V_Pid_2 | V_Pname_2 | 0 | P_Pid_2 | P_Pname_2 | 0 | Storage Control part #2 | Out Port |
| V_Pid_3 | V_Pname_3 | 0 | P_Pid_3 | P_Pname_3 | 0 | Out Port | Out Port |
| . | . | . | . | . | . | . | . |

FIG.23

| Source Management Information (530) | | Destination Management Information (535) | |
|---|---|---|---|
| Source Identification | Source Command Identification | Destination Identification | Command Identification |
| Host_Pid_1 | Host_Tag_1 | SC #1 | InPort_Tag_1 |
| Host_Pid_1 | Host_Tag_2 | SC #2 | InPort_Tag_2 |
| Host_Pid_1 | Host_Tag_3 | Out Port | InPort_Tag_3 |
| . | . | . | . |

FIG.25

| Virtual Volume Management Information 515 | | | Real Volume Management Information 521 | | | Virtualization Module Management Information 523 |
|---|---|---|---|---|---|---|
| Port ID | Port Name | LUN | Port ID | Port Name | LUN | |
| V_Pid_1 | V_Pname_1 | 0 | - | - | - | SC #1 |
| V_Pid_2 | V_Pname_2 | 0 | P_Pid_2 | P_Pname_2 | 0 | SC #2 |
| V_Pid_3 | V_Pname_3 | 0 | P_Pid_3 | P_Pname_3 | 0 | Out Port |
| . | . | . | . | . | . | . |

FIG.26

| Virtual Volume Management Information 515 | | | Real Volume Management Information 521 | | | Virtualization Module Management Information 523 | External Volume Connection Module Management Information 524 |
|---|---|---|---|---|---|---|---|
| Port ID | Port Name | LUN | Port ID | Port Name | LUN | | |
| V_Pid_2 | V_Pname_2 | 0 | P_Pid_2 | P_Pname_2 | 0 | SC #2 | Out Port |
| . | . | . | . | . | . | . | . |

FIG.27

| Virtual Volume Management Information 515 | | | Real Volume Management Information 521 | | | Virtualization Module Management Information 523 |
|---|---|---|---|---|---|---|
| Port ID | Port Name | LUN | Port ID | Port Name | LUN | |
| V_Pid_2 | V_Pname_2 | 0 | P_Pid_2 | P_Pname_2 | 0 | SC #2 |
| V_Pid_3 | V_Pname_3 | 0 | P_Pid_3 | P_Pname_3 | 0 | Out Port |
| . | . | . | . | . | . | . |

FIG.28

| Virtual Volume Management Information | | | Real Volume Management Information | | | Virtualization Module Management Information |
|---|---|---|---|---|---|---|
| Port ID | Port Name | LUN | Port ID | Port Name | LUN | |
| V_Pid_1 | V_Pname_1 | 0 | - | - | - | SC #1 |
| V_Pid_2 | V_Pname_2 | 0 | P_Pid_2 | P_Pname_2 | 0 | Out Port |
| V_Pid_3 | V_Pname_3 | 0 | P_Pid_3 | P_Pname_3 | 0 | Out Port |
| . | . | . | . | . | . | . |

FIG.29

| Virtual Volume Management Information | | | Real Volume Management Information | | | Virtualization Module Management Information | External Volume Connection Module Management Information |
|---|---|---|---|---|---|---|---|
| Port ID | Port Name | LUN | Port ID | Port Name | LUN | | |
| . | . | . | . | . | . | . | . |

FIG.30

| Virtual Volume Management Information | | | Real Volume Management Information | | | Virtualization Module Management Information |
|---|---|---|---|---|---|---|
| Port ID | Port Name | LUN | Port ID | Port Name | LUN | |
| V_Pid_2 | V_Pname_2 | 0 | P_Pid_3 | P_Pname_3 | 1 | Out Port |
| V_Pid_3 | V_Pname_3 | 0 | P_Pid_3 | P_Pname_3 | 0 | Out Port |
| . | . | . | . | . | . | . |

VIRTUALIZATION CONTROLLER AND DATA TRANSFER CONTROL METHOD

CROSS-REFERENCES TO RELATED APPLICATIONS

The present application is a continuation of application Ser. No. 10/663,480, filed Sep. 15, 2003 (now U.S. Pat. No. 7,263,593) and claims priority from Japanese Patent Application No. 2002-340276, filed on Nov. 25, 2002, the entire disclosure of which is incorporated herein by reference.

BACKGROUND OF THE INVENTION

The present invention relates to methods and systems for transferring data between a plurality of storage devices, and more particularly to methods and systems for transferring data between the plurality storage devices without a host computer issuing an access request to a storage device being aware of the data transfer process.

There has been a data transfer control technique as used in a storage device subsystem such as a disk array subsystem in which a plurality of volumes are controlled by a controller, that frequently accessed data is transferred to a quickly accessible volume and infrequently accessed data is transferred to a slowly accessible volume. U.S. Patent Application Publication No. 2001/0054133 also discloses a technique for efficient data transfer concerning a system in which a volume used by an application is provided over a plurality of storage areas which are controlled by different controllers. According to this technique, data in a volume which is used by a specific application is transferred preferentially.

Data transfer in a storage device subsystem is executed by a controller which controls the storage device subsystem, and the controller can hide the data transfer process from a host computer connected with it. However, this method does not take into consideration data transfer which takes place over more than one storage device subsystem. Therefore, if data stored in a certain storage device subsystem is to be transferred to another storage device subsystem, the controller must inform the host computer that, in data transfer, the storage device subsystem to be accessed will change, which means that it is impossible to hide the data transfer process from the host computer. Also, U.S. Patent Application Publication No. 2001/0054133 does not disclose any technique of hiding such data transfer process from the host computer. Consequently, for data transfer, the host computer must stop its operation once and specify the storage device or volume to be accessed again.

Recently as data communications in companies have been explosively increasing, demand for continuous, around-the-clock access to storage devices has been growing. Taking this situation into account, it is expected that data transfer between a plurality of storage devices will have to be handled more and more frequently in the future. Thus, there is a growing need for a technique that enables data transfer between storage devices without interrupting operation of the host computer.

When a controller which manages the storage area of a storage device and forwards an access request from the host computer to the storage area is replaced or newly installed, the host computer deems that the storage area to, be accessed has been changed, and has to once stop its operation and specify the storage area to be accessed again as when data transfer between a plurality of storage devices takes place.

SUMMARY OF THE INVENTION

Embodiments of the present invention are directed to systems and methods of controlling data transfer between a host system and a plurality of storage devices. A feature of the invention is to provide a controller which enables data transfer between storage devices without causing a host computer to become aware of it, and a data transfer method thereof. Another feature of the invention is to provide a controller which allows a controller to be replaced or newly installed without causing a host computer to become aware of it and a data transfer method thereof.

In specific embodiments, a virtualization controller which is connected with a plurality of storage devices controls data transfer between the storage devices. The virtualization controller controls the data transfer process in a way that the host computer can identify the destination volume (a volume to which data is transferred) using the same identification information that it uses to identify the source volume (a volume from which data is transferred). Furthermore, when the virtualization controller is replaced or a new virtualization controller is installed, the new virtualization controller controls the frame sending process in a way that the host computer can access the same volume even after the replacement or installation using the same identification information that it used to identify the volume to be accessed, before the replacement or installation.

An aspect of the present invention is directed to a virtualization controller for controlling data transfer between a host system and a plurality of storage devices. The virtualization controller comprises a plurality of first ports for connection with the plurality of storage devices each having a storage area to store data; a second port for connection with the host system; a processor; and a memory configured to store volume mapping information which correlates first identification information used by the host system to access a first storage area in one of the storage devices, with second identification information for identifying the first storage area, the correlation being used by the processor to access the first storage area. When data stored in the first storage area is transferred to a second storage area in one of the storage devices, the processor correlates the first identification information with a third identification information for identifying the second storage area and registers the first identification information and the third identification information in the volume mapping information.

In accordance with another aspect of the invention, a data control system connected to one or more host systems comprises a plurality of storage devices each having a storage area; and a switch which is connected with the plurality of storage devices and the one or more host systems. The switch includes a plurality of first ports for connection with the storage devices; one or more second ports for connection with the one or more host systems; a memory configured to store information on a correlation between first identification information used by the host system to access a first storage area of one of the storage devices, and second identification information for identifying the first storage area; and a routing processor configured to convert data with the first identification information received from the host system into data with the second identification information and to send the converted data to the storage device having the first storage area according to the correlation information. When data stored in the first storage area is transferred to a second storage area of one of the storage devices, the routing processor converts data with the first identification information into data with third identification information for identifying the second storage area and sends the converted data to the storage device having the second storage area.

Another aspect of this invention relates to a method of controlling data transfer in a system including a host system which uses first identification information to access a first storage area in one of a plurality of storage devices, wherein the first storage area includes data associated with second identification information identifying the first storage area. The method comprises issuing a data transfer request to the first storage device to transfer the data with the second identification information in the first storage device to a second storage device; and upon receipt of notification of completion of data transfer from the first storage device to the second storage device, correlating the first identification information with a third identification information identifying the second storage area containing the transferred data.

Yet another aspect of the invention is directed to a method of connecting a virtualization controller between a host system and a storage device which are connected through a first path between a first port of the host system and a first port of the storage device and a second path between a second port of the host system and a second port of the storage device. The method comprises accessing a storage area of the storage device; disconnecting the second path between the second port of the host system and the second port of the storage device; connecting the second port of the host system with the virtualization controller through a third path; connecting the virtualization controller with the second port of the storage device through a fourth path; and setting, on the virtualization controller, identification used by the host system to identify the storage area, identification information for the second port of the storage device, and virtual port identification information for the virtualization controller, which are correlated to define access of the storage area by the host system.

BRIEF DESCRIPTION OF THE DRAWINGS

FIG. 5 shows an example of storage device state management information which is managed by the virtualization controller according to the first embodiment.

FIG. 12 shows an example of volume mapping information which is managed by the virtualization controller according to the second embodiment.

FIG. 15 shows an example of volume mapping information which is managed by the virtualization controller according to the third embodiment.

FIG. 18 shows an example of volume management information which is managed by the host computer according to the second embodiment.

FIG. 22 shows an example of volume mapping information which is managed by the virtualization controller according to the fourth embodiment.

FIG. 23 shows an example of routing control information which is managed by the virtualization controller according to the fourth embodiment.

FIG. 25 shows an example of volume mapping information which is managed by a port section (In Port) according to the fourth embodiment.

FIG. 26 shows an example of volume mapping information which is managed by a storage control part according to the fourth embodiment.

FIG. 27 shows an example of volume mapping information which is managed by a port section (Out Port) according to the fourth embodiment.

FIG. 28 shows an example of volume mapping information which is managed by a port section (In Port) according to the fourth embodiment.

FIG. 29 shows an example of volume mapping information which is managed by a storage control part according to the fourth embodiment.

FIG. 30 shows an example of volume mapping information which is managed by a port section (Out Port) according to the fourth embodiment.

DETAILED DESCRIPTION OF THE INVENTION

Embodiment 1

A first embodiment of the present invention will be explained referring to FIGS. 1 to 12.

Figure 1:
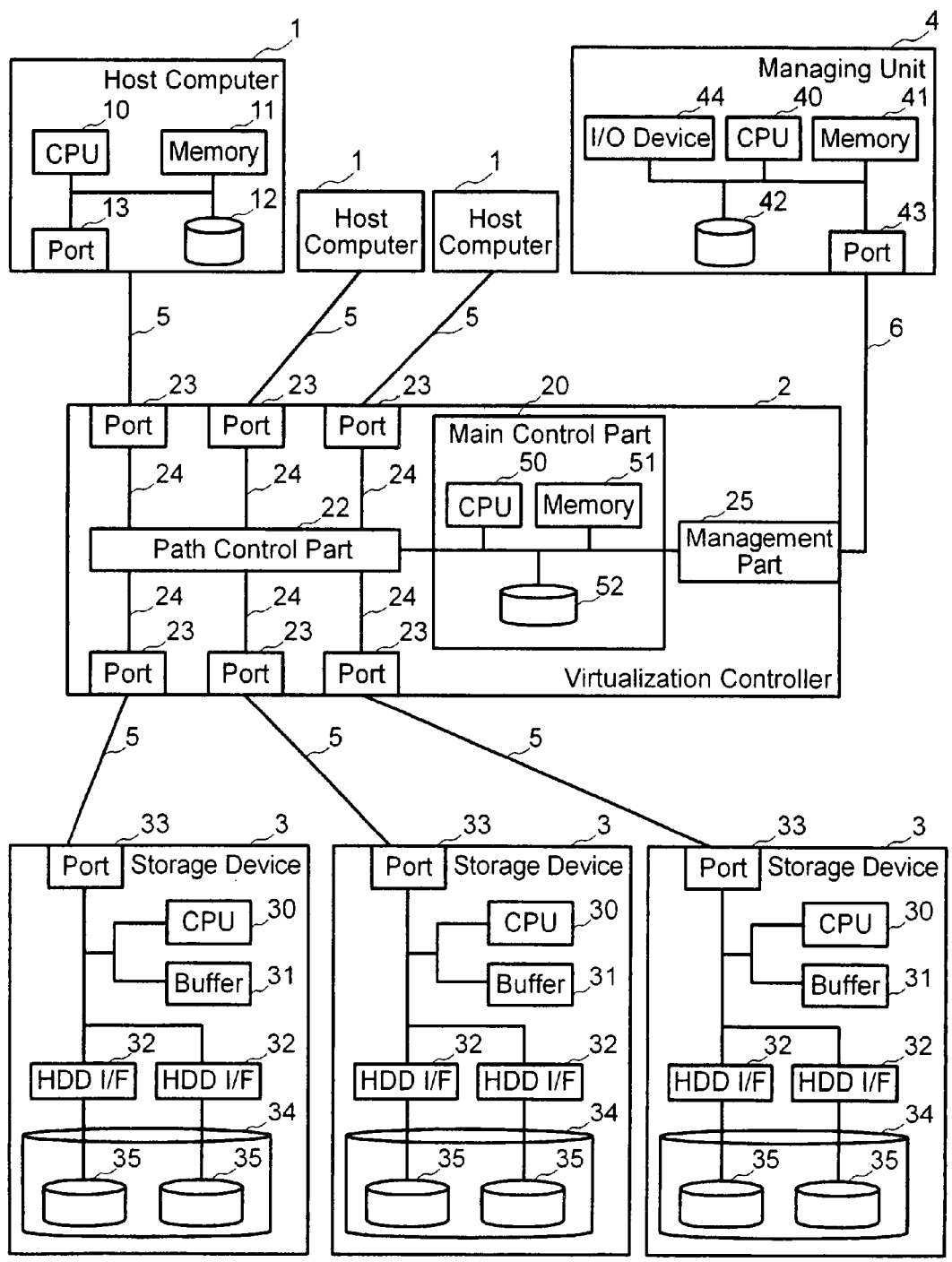
FIG. 1 shows an example of a computer system according to the present invention.

FIG. 1 shows one example of a computer system according to the present invention. The computer system has a plurality of host computers 1, a plurality of storage devices 3, a virtualization controller 2 which is connected with the host computers 1 and storage devices 3, and a managing unit 4. The host computers 1 and storage devices 3 are connected with the virtualization controller 2 via a network 5, while the managing unit 4 is connected with the virtualization controller 2 via a network 6. The networks 5 and 6 may use the same network protocol or different network protocols. It is also possible that in the network 5, the protocol for connection between the storage devices and the virtualization controller is different from that for connection between the host computers and the virtualization controller. Also, a different network protocol may be used to connect each storage device or each host computer with the virtualization controller 2.

Each of the host computers 1 has a CPU 10 for execution of an application program, a memory 11 for storage of the application program, a recording medium 12 and a port 13 which is connected to the network 5 to receive or send data.

The managing unit 4 has a CPU 40 which executes a management program for management of the virtualization controller 2, a memory 41 for storage of the management program, a port 43 which is connected to the network 6 to receive or send data, and a recording medium 42.

Each of the storage devices 3 has the following components: a port 33 which is connected to the network 5 to receive or send data; a disk device group 34 which includes a plurality disk devices 35; a disk interface controller 32 (HDD I/F in FIG. 1) which processes data transmission with each disk device 35; a CPU 30 which controls each access to a disk device 35 in response to an access request from a host computer 1; and a buffer 31 which stores data to be transmitted between a host computer 1 and a disk device 35.

The virtualization controller 2 is a switch which transmits frames between the host computers 1 and storage devices 3. The virtualization controller 2 has the following components: a plurality of ports 23 for data transmission with the host computers 1 or storage devices 3; a path control part 22 which controls path selection for the plurality of ports 23; a managing part 25 which handles data transmission to or from the managing unit 4; and a main control part 20 which controls the virtualization controller according to data transmitted with the managing unit 4. The main control part 20 has a memory 51 and a recording medium 52 which store a program (discussed hereinbelow) and information, and a CPU 50 which executes the program using this information. FIG. 1 shows a situation in which the path control part 22 is connected with the CPU 50, memory 51 and recording medium 52 in the main control part 20 via a bus. However, it may also be possible that the path control part 22 and the main control part 20 are connected by means of a bridge.

Although FIG. 1 shows a situation in which the host computer 1, storage devices 3 and managing unit 4 each have one port, the number of ports is not limited thereto and they may have more than one port. Furthermore, the ports 23 of the virtualization controller are compatible with different network protocols so the ports 23 may be used as managing ports.

Each of the storage devices 3 may at least have a port 33 which is connected to the network 5 to receive or send data, and an area for storage of data to be accessed from a host computer 1; therefore it may be a separate disk device or the like.

Figure 2:
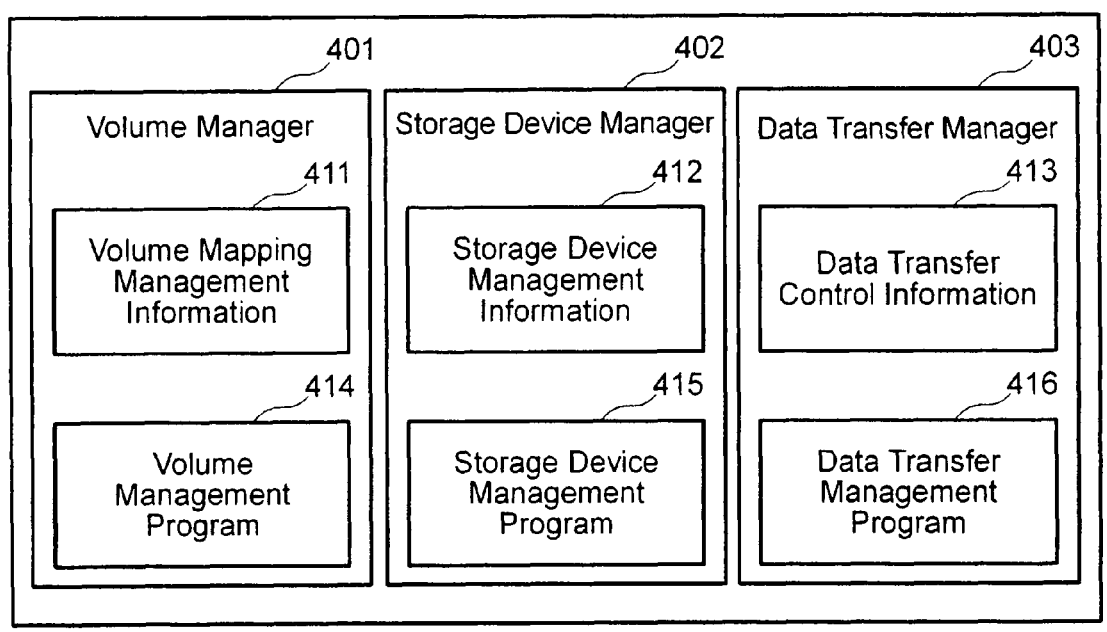
FIG. 2 shows programs and information which are stored in the recording medium of the managing unit, as an example.

FIG. 2 shows, as an example, programs which are stored in the recording medium 42 of the managing unit 4 and read into the memory 41 and executed by the CPU 40, and management information which is stored in the recording medium 42 of the managing unit 4.

A volume management program 414 is a program which is executed to read volume mapping information 515 (discussed hereinbelow) from the virtualization controller 2 and send it to an output device to inform an administrator of the volume mapping information 515 or receive, from the administrator through an input device, information to be newly registered in the volume mapping information 515 or updating information for the volume mapping information, and send it to the virtualization controller 2 and set the information received from the administrator in the volume mapping information 515. Volume mapping management information 411 includes volume mapping information 515 read from the virtualization controller 2 and registration or updating information received from the administrator. A volume manager 401 is implemented in that the CPU 40 of the managing unit 4 executes the volume management program 414 using the volume mapping management information 411.

Here, a volume refers to a storage area which is managed by each storage device (including a virtual storage device); it is possible for one storage device to manage more than one volume. Hereinafter, volumes which are managed by the storage devices 3 are called "real volumes" and volumes which are managed by the virtualization controller 2 are called "virtual volumes."

A storage device management program 415 is a program which is executed to read storage device state management information 512 (discussed hereinbelow) from the virtualization controller 2 and send it to an output device to inform the administrator of the state of a storage device or receive, from the administrator through an input device, information to be registered in the storage device state management information 512 or updating information, and set the information on the virtualization controller 2. Storage device management information 412 includes storage device state management information 512 received from the virtualization controller 2 and registration or updating information received from the administrator. A storage device manager 402 is implemented in that the CPU 40 of the managing unit 4 executes the storage device management program 415 using the storage device management information 412.

A data transfer management program 416 is a program which is executed to generate data transfer control information 413 to transfer data between volumes under the control of the virtualization controller 2, issue a data transfer request containing data transfer control information 413 to the virtualization controller 2, receive the result of processing for data transfer from the virtualization controller 2 and inform the administrator of the result. A data transfer manager 403 is implemented in that the CPU 40 of the managing unit 4 executes the data transfer management program 416.

Figures 3, 4:
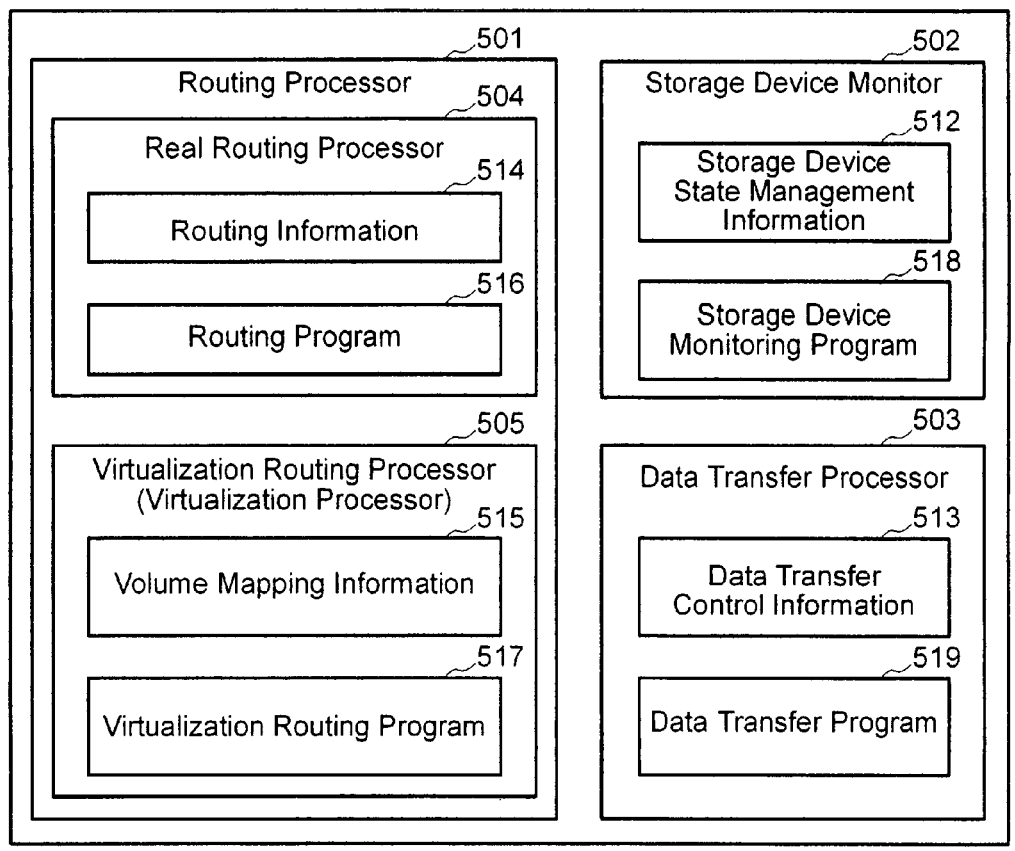
FIG. 3 shows programs and information which are stored in the recording medium of the virtualization controller, as an example.
FIG. 4 shows an example of volume mapping information which is managed by the virtualization controller according to the first embodiment of the present invention.

FIG. 3 shows, as an example, programs which are stored in the recording medium 52 of the virtualization controller 2 and read into the memory 51 and executed by the CPU 50, and management information which is stored in the recording medium 52 of the virtualization controller 2.

A routing processor 501 performs the following two routing tasks for frame data which is transmitted between a host computer 1 and a storage device 3.

Here, frame data includes all information such as access request information sent from the host computer 1 to the storage device 3, status information sent from the storage device 3 to the host computer 1, and data which is transmitted between the host computer 1 and the storage device 3 according to access request information.

A real routing processor 504 controls routing of frame data transmitted directly between the host computer 1 and the storage device 3 according to routing information 514 as information on interconnection of devices connected to the network 5. In other words, the real routing processor 504 instructs the path control part 22 on which path to be used for frame data transmission. As instructed by the real routing processor 504, the path control part 22 transmits frame data. The real routing processor 504 is implemented in that the CPU 50 of the virtualization controller 2 executes a routing program 516 read in the memory 51 according to routing information 514.

Then, according to volume mapping information 515 (discussed hereinbelow), a virtualization routing processor 505 (hereinafter called the virtualization processor) processes the frame data received from the host computer 1 as explained later and sends it to the storage device 3 or processes the frame data received from the storage device 3 as explained later and sends it to the host computer 1. The virtualization processor 505 is implemented in that the CPU 50 of the virtualization controller 2 executes a virtualization routing program 517 read in the memory 51 according to the volume mapping information 515.

FIG. 1 and FIG. 2 show an embodiment in which the virtualization controller 2 has one main control part 20 and the main control part 20 carries out a routing process including a virtualization process. However, the present invention is not limited thereto. An alternative approach may be that each of the ports 23 has a processor which performs the routing process. This will enable parallel routing operation at each port, thereby improving the performance of the virtualization controller 2. It is also possible that the routing processor consists of hardware only.

A storage device monitor 502 in FIG. 3 monitors the state of each storage device 3 which is an object of virtualization control by the virtualization controller 2, holds the result of monitoring as storage device state management information 512, in the event of detection of a change in the state of a storage device 3, informs the managing unit 4 of the change in the state, and updates the storage device state management information 512 held by itself according to the storage device management information 412 received from the managing unit 4. The storage device monitor 502 is implemented in that the CPU 50 of the virtualization controller 2 executes a storage device monitoring program 518.

A data transfer processor 503 stores data transfer control information 413 which is included in the data transfer request received from the managing unit 4, in the memory 51 or recording medium 52 of the virtualization controller 2 as data transfer control information 513, and performs the process of data transfer between volumes under the control of the virtualization controller 2 according to the data transfer control information 513. The data transfer processor 503 is implemented in that the CPU 50 of the virtualization controller 2 executes a data transfer program 519. Details of the data transfer process will be given later.

FIG. 4 shows an example of volume mapping information 515 which is managed by the virtualization controller 2. The volume mapping information 515 is control information which shows mapping (correlation) between virtual volumes and real volumes. The virtual volume management information 520 includes virtual volume identification information and information representing a virtual volume state. Virtual volume identification information includes Port ID, unique in the network, Port Name, unique to each port, and LUN (Logical Unit Number), unique in the device. Information representing a virtual volume state includes Size, which indicates the capacity of a virtual volume, and virtual volume Status information. The real volume management information 521 includes information for identifying the real volume corresponding to a virtual volume and information representing a real volume state. Real volume identification information includes Port ID, unique in the network, Port Name, unique to each port, and LUN, unique in the device. Information which represents a real volume state includes Size, which indicates the capacity of a real volume, and real volume Status information.

Here, Port ID and Port Name as virtual volume identification information are identifiers assigned to a virtual port (hereinafter a "virtual port") of a storage device virtually shown to the host computer 1 (hereinafter "virtual storage device"). For instance, when the host computer specifies Port ID of a virtual port and LUN of a virtual volume and sends frame data, the virtualization processor 505 of the virtualization controller 2 controls the process in a way that according to volume mapping information 515, the frame data is sent to the storage device having the real volume corresponding to the virtual volume identified by Port ID and LUN. However, it appears to the host computer as if it were accessing the storage device having a port identified by Port ID specified by it.

FIG. 4 shows a case that the virtual volume identified by LUN=0 which is accessed through the virtual port identified by Port ID=V_Pid.sub.—1, Port Name=V_Pname.sub.—1 is mapped to (correlated with) the real volume identified by LUN=0 which is accessed through the real port identified by Port ID=P_Pid.sub.—1, Port Name=P_Pname.sub.—1.

A virtual port may have a plurality of virtual volumes. In the case shown in FIG. 4, the virtual port identified by Port ID=V_Pid.sub.—2, Port Name=V_Pname.sub.—2 has two virtual volumes, LUN=0 (5 GB), LUN=1 (5 GB), which are mapped to real volumes identified by Port ID=V_Pid__2, Port Name=V_Pname__2, LUN=0 (5 GB) and Port ID=V_Pid__1, Port Name=V_Pname.sub.—1, LUN=1 (5 GB), respectively.

An example of control which uses status information will be described later.

FIG. 5 shows an example of storage device state management information 512 which is managed by the virtualization controller 2. The storage device state management information 512 has identification information for a storage device detected by the storage device monitor 502 and the real volume managed by this storage device. In this example, the storage device state management information 512 includes identification information such as Port ID which is assigned to a storage device port and unique in the network, Port Name, unique to each port, Node Name, unique to each storage device, and LUN which is assigned to each real volume in the storage device and unique in the device, as well as real volume state information such as Size. Although FIG. 5 shows a case that Port ID, Port Name, Node Name, LUN and Size information are shown as the storage device state management information 512, the storage device state management information 512 is not limited thereto. For example, it is possible to register information on ports of the virtualization controller 2 connected with real volumes as the storage device state management information 512.

FIG. 5 shows a case that the port identified by Port ID=P_Pid.sub.—1, Port Name=P_Pname.sub.—1, Node Name=P_Nname.sub.—1 has the real volumes identified by LUN=0 (10 GB), LUN=1 (5 GB) and the port identified by Port ID=P_Pid.sub.—2, Port Name=P_Pname.sub.—2, Node Name=P_Name 2 has the real volume identified by LUN=0 (5 GB), and the port identified by Port ID=P_Pid.sub.—3, Port Name=P_Pname.sub.—3, Node Name=P_Nname.sub.—3 has the real volume identified by LUN=1 (10 GB).

Here, real volume identification information (LUN) or identification information for ports having real volumes (Port ID, Port Name, Node Name) can be used as an entry for real volume management information 521 of the volume mapping information 515 or as an entry for routing information 514. It is desirable that the storage device state management information 512 can be set by the managing unit 4. In the present invention, as described above, when the CPU 40 of the managing unit 4 executes the storage device management program 415, the managing unit 4 can set storage device state management information 512.

Furthermore, when a new storage device is connected to the virtualization controller 2, the CPU 50 of the virtualization controller 2 executes the storage device monitoring program 518 to obtain Port ID, Port Name, Node Name, LUN, and Size information from the newly connected storage device and register it in the storage device state management information 512 and inform the managing unit 4 of detection of the new device. Preferably the virtualization controller 2 should not execute the process of routing to the new device (should not make a registration into an entry for the routing information 514) until the managing unit executes the volume management program 414 and sets status information of the virtual volume management information 520 of the volume mapping information 515.

On the other hand, when a storage device already connected with the virtualization controller 2 is disconnected, or when the virtualization controller 2 detects a problem that a storage device does not respond or a similar problem, the virtualization controller 2 updates the information registered in the storage device state management information 512 and informs the managing unit 4 of the change in the state of the storage device. At this time, the virtualization controller 2 refers to the virtual volume management information 520 of the volume mapping information 515. It is desirable that only when the status information satisfies a certain condition (for example, only when there is a change in the state of a device whose status information is set as "Active") should it inform the managing unit 4 of the change in the state. It is also possible that one storage device has more than one port, though such a case is not shown in FIG. 5.

Figure 6:
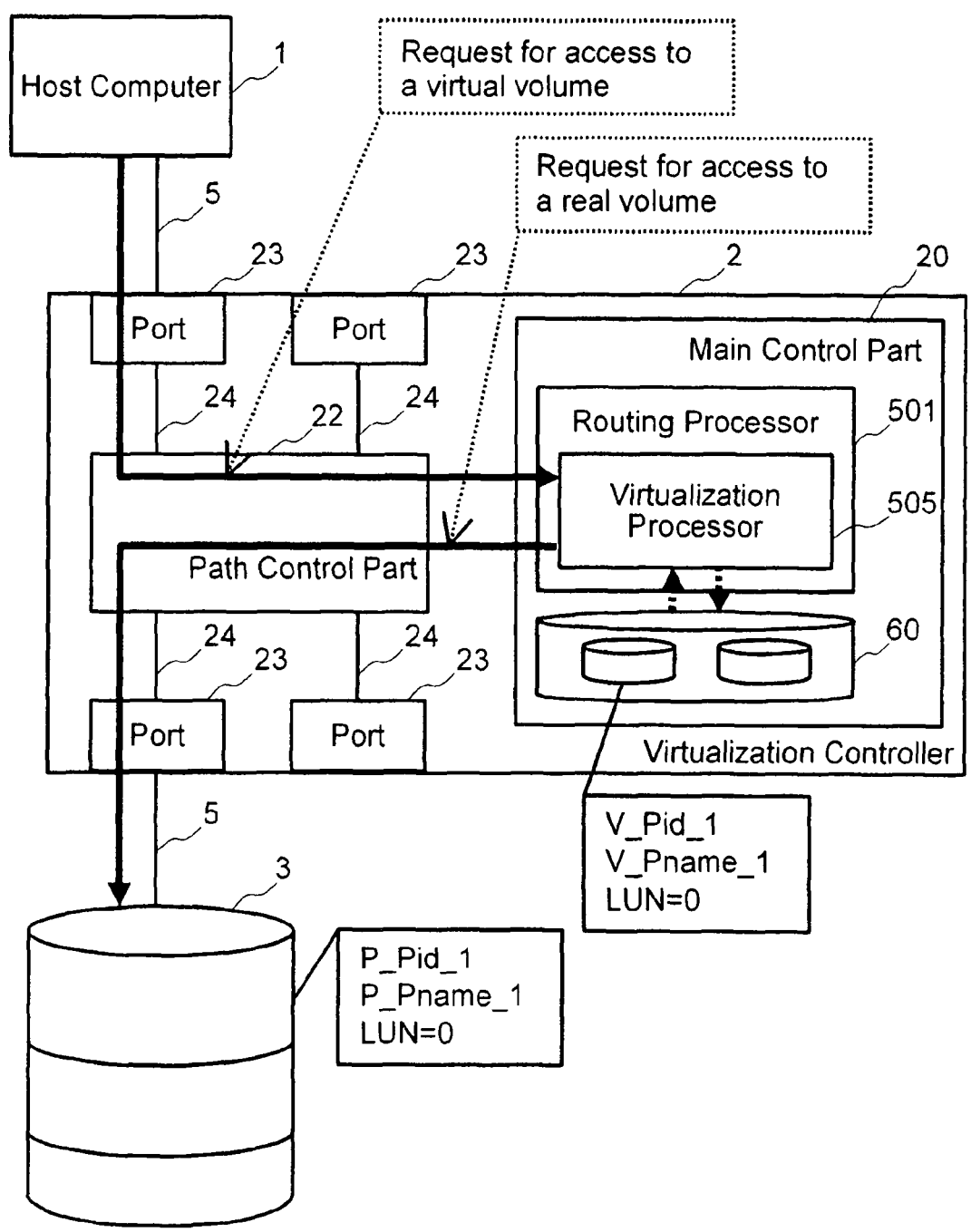
FIG. 6 outlines how a request for access to a virtual storage device from the host compute is processed according to the first embodiment of the present invention.

FIG. 6 outlines how an access request is processed when the host computer 1 accesses a storage device virtualized by the virtualization controller 2 (virtual storage device). As shown in FIG. 6, the host computer 1 issues a request for access to the virtual volume LUN=0 (10 GB) of the virtual volume identified by Port ID=V_Pid._1, Port Name=V_Pname._1, among the virtual volume group 60 which includes a plurality of virtual volumes virtualized by the virtualization controller 2.

The routing processor 501 detects that the access request issued from the host computer 1 to the virtual volume is a request for access to a virtual storage device. In this embodiment, when the routing processor 501 detects that Port ID in the access request is included in the virtual volume management information of the volume mapping information 515, the request is found to be a request for access to a virtual storage device. Then, the virtualization processor 505 refers to Port ID and LUN which are included in the access request; and the access request is converted into a request for access to the real volume registered in the volume mapping information 515 which corresponds to the Port ID and LUN. Then the converted access request is issued to the storage device 3. The virtualization processor 505 carries out the abovementioned conversion of the access request by converting the Port ID and LUN included in the access request issued from the host computer 1 into Port ID and LUN of the corresponding real volume registered in the volume mapping information 515.

After this, a series of operations, including data reception/transmission between the host computer 1 and the storage device 3 and transmission of status information, are carried out through the virtualization controller 2. In data reception/transmission, transmission of status information, etc., frame data which is transmitted between the host computer 1 and the storage device 3 is also converted by the virtualization processor 505. Here, conversion does not mean conversion of data itself but conversion of information added to data such as destination (receiver) identification information (DID), source (sender) identification information (S_ID), error detection code CRC (Cyclic Redundancy Check) and the like. For example, if the virtualization controller 2 receives an access request with D_ID=V_Pid._1 from the host computer 1, the routing processor 501 converts its D_ID into P_Pid._1 using volume mapping information, newly generates CRC, adds it to the frame data and sends the converted frame data to the storage device 3. On the other hand, if the virtualization controller 2 receives frame data with S_ID=P_Pid._1 from the storage device 3, the routing processor 501 converts its S_ID into V_Pid._1, replaces the CRC in the frame data by the newly generated CRC and sends the frame data to the host computer 1.

Figure 7:
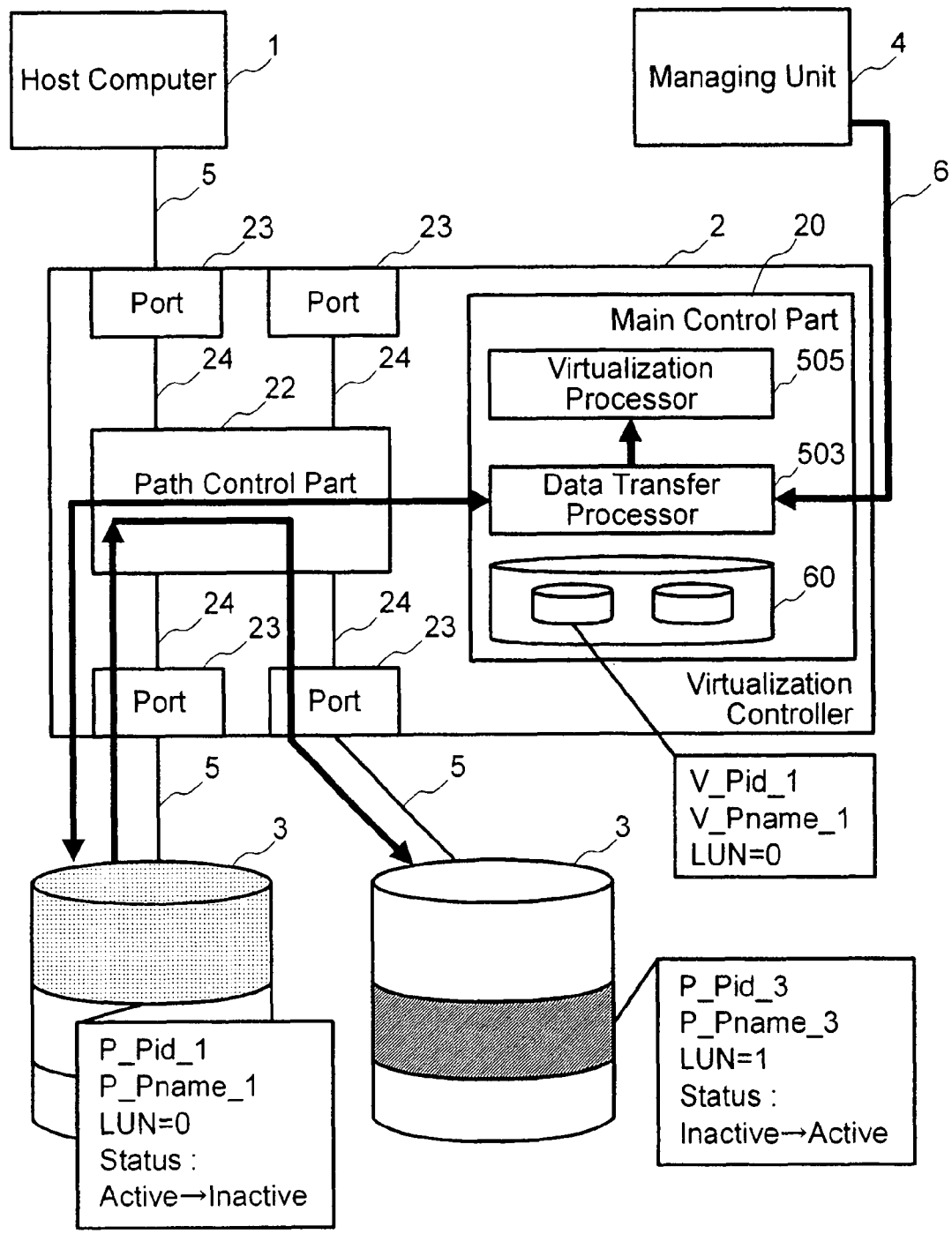
FIG. 7 outlines the process of data transfer between storage devices according to the first embodiment.

FIG. 7 outlines how the real volume of a storage device 3 correlated with a virtual volume which the virtualization controller 2 provides to the host computer, is changed to the real volume of another storage device and the mapping (correlation) between the virtual and real volumes is revised. In this case, data transfer is made from the former real volume so far correlated with the virtual volume to the real volume to be newly correlated with the virtual volume.

FIG. 7 shows a case that a request for storing (transferring) data stored in the real volume identified by Port ID=P_Pid._1, Port Name=P_Pname._1, LUN=0 into the real volume identified by Port ID=P_Pid._3, Port Name=P_Pname._3, LUN=1 arises under a certain condition and the administrator issues a data transfer request through the managing unit 4 to the virtualization controller 2. The data transfer request issued from the managing unit contains data transfer control information 413 including information for identifying the source and destination real volumes for data transfer (Port ID, Port Name, LUN, etc.).

In the virtualization controller 2 which has received the data transfer request, the data transfer processor 503 of the main control part 20 analyzes data transfer control information and performs processing for data transfer according to the result of the analysis. In other words, as in the case shown in FIG. 7, under the control of the data transfer processor 503, the virtualization controller 2 issues a data transfer (copy) request to the storage device 3 having the real volume identified by Port ID=P_Pid._1, Port Name=P_Pname._1, LUN=0. This data transfer request contains information for identifying the destination real volume for data transfer (Port ID=P_Pid._3, Port Name=P_Pname._3, LUN=1 in the case shown in FIG. 7). The storage device having the port identified by P-Pid-1 which has received the data transfer request, sends the data stored in the real volume identified by LUN=0 to the real volume identified by Port ID=P_Pid._3, Port Name=P_Pname._3, LUN=1. The storage device having the port identified by P_Pid._3 stores the frame_ata received from the storage device having the port identified by P_Pid._1, in the real volume identified by LUN=1. Data transfer is thus performed by copying the data from the storage device with the port identified by P_Pid._1 to the storage device with the port identified by P_Pid._3.

After completion of the data transfer process, the data transfer processor 503 enters the destination real volume ID in the volume mapping information 515 and also updates the status information in the virtual volume management information 520 and enters the updated information. One example of volume mapping information 515 which has undergone such updating and entry is shown in FIG. 8.

Figures 8, 9:
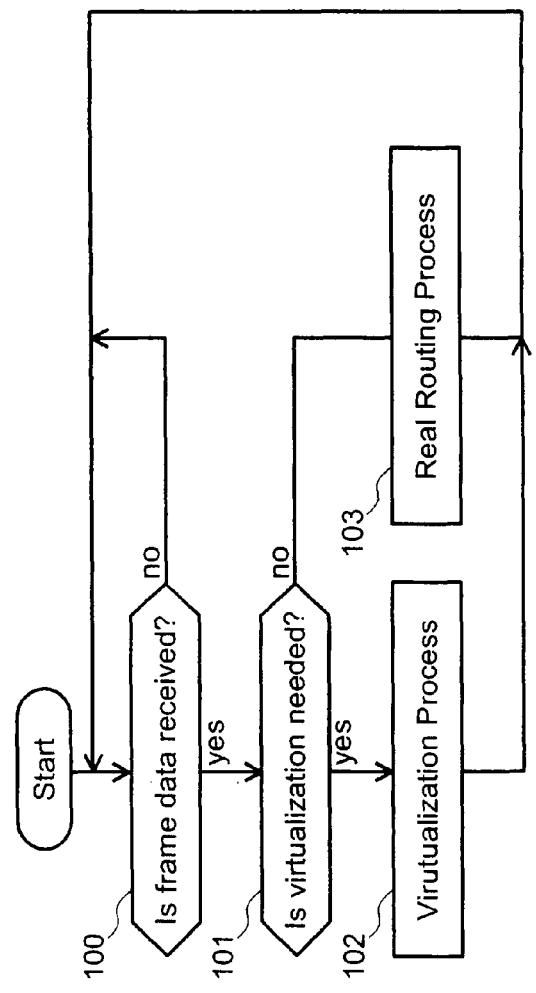
FIG. 8 shows another example of volume mapping information which is managed by the virtualization controller according to the first embodiment.
FIG. 9 shows an example of the process which is performed by the routing processor of the virtualization controller according to the first embodiment.

FIG. 8 shows an example of volume mapping information 515 revised as a result of the data transfer process shown in FIG. 7, where the real volume mapped to (correlated with) the virtual volume identified by Port ID=V_Pid.sub.—1, Port Name=V_Pname.sub.—1, LUN=0 is changed from the real volume identified by Port ID=P_Pid.sub.—1, Port Name=P_Pname.sub.—1, LUN=0 (source real volume) to the real volume identified by Port ID=P_Pid.sub.—3, Port Name=P_Pname.sub.—3, LUN=1 (destination real volume).

FIG. 8 shows that the real volume identified by Port ID=P_Pid.sub.—1, Port Name=P_Pname.sub.—1, LUN=0 (source real volume) and the real volume identified by Port ID=P_Pid.sub.—3, Port Name=P_Pname.sub.—3, LUN=1 (destination real volume) are registered as the real volumes which are mapped to (correlated with) the virtual volume identified by Port ID=V_Pid.sub.—1, Port Name=V_Pname__1, LUN=0. Furthermore, the status information of the virtual volume management information 520 is "Active" for the real volume identified by Port ID=P_Pid.sub.—3, Port Name=P_Pname.sub.—3, LUN=1 and Inactive for the real volume identified by Port ID=P_Pid.sub.—1, Port Name=P_Pname__1, LUN=0. An access request to a virtual volume is executed on a real volume whose status information is "Active". For example, if the routing processor transmits an access request or frame data according to the volume mapping information 515 shown in FIG. 8, the request for access to the virtual volume identified by Port ID=V_Pid.sub.—1, Port Name=V_Pname.sub.—1, LUN=0 or data transmission according to this request is executed on the real volume identified by Port ID=P_Pid.sub.—3, Port Name=P_Pname.sub.—3, LUN=1, depending on the status information of the virtual volume management information 520.

In this embodiment, as mentioned above, when data in a real volume owned by a storage device is transferred to a real volume owned by another storage device, mapping (correlation) between the virtual and real volumes is revised by the data transfer processor 503. However, the identification information which the host computer uses to access a volume is information for identifying a virtual volume (Port ID, Port Name of the virtual port and LUN of the virtual volume) which does not change even when data transfer is made. Let's look at the case of data transfer shown in FIG. 7. When the host computer issues an access request to the virtual volume identified by Port ID=V_Pid.sub.—1, Port Name=V_Pname.sub.—1, LUN=0, before data transfer the virtualization processor 505 sends the access request to the real volume identified by Port ID=P_Pid.sub.—1, Port Name=P_Pname.sub.—1, LUN=0 according to the volume mapping information 515 shown in FIG. 4. After data transfer, the virtualization processor 505 sends the access request to the real volume identified by Port ID=P_Pid.sub.—3, Port Name=P_Pname.sub.—3, LUN=1 according to the volume mapping information 515 shown in FIG. 8. Therefore, according to this embodiment, it is possible to transfer data between storage devices without revising the identification information which the host computer uses to identify the volume to be accessed.

The volume mapping information 515 shown in FIG. 8 contains information for identifying an uncompleted command issued to a real volume. In the case shown in FIG. 8, uncompleted commands C_id.sub.—0, C_id.sub.—1, C_id.sub.—2 are registered in the source real volume identified by P_Pid.sub.—1, P_Pname.sub.—1, LUN=0 and uncompleted commands C_id.sub.—3, C_id.sub.—4 (commands to the virtual volume for data transfer which the virtualization controller 2 receives from the host computer after the data transfer processor 503 sends the data transfer request to the source real volume) are registered in the destination real volume identified by Port ID=P_Pid.sub.—3, Port Name=P_Pname.sub.—3, LUN=1. A command is registered in the volume mapping information by the virtualization controller 2 when the virtualization controller 2 receives it from the host computer, and deleted when the virtualization controller 2 receives, from a storage device, status information or the like which notifies of completion of a process that depends on the command. However, when the virtualization controller 2 sends the data transfer request to the source real volume, it registers a command to the virtual volume for data transfer which it receives from the host computer 1, in an entry for the destination real volume. If the virtualization controller 2 receives status information on completion of a data write command from the source storage device 3 after it sends the data transfer request to the source real volume, it only sets information on completion of the command in the volume mapping information 515 without deleting the registered uncompleted command. The volume mapping information 515 may contain not only information for identifying uncompleted commands but also command information, though omitted in FIG. 8.

In the case shown in FIGS. 7 and 8, data is transferred volume by volume. However, the present invention is not limited thereto. It is also possible to transfer data on a block address basis as far as the volume mapping information 515 holds start/end address information of the source storage device and the start/end address information of the destination storage device.

Also, in the case shown in FIGS. 7 and 8, the data transfer processor 503 issues a data transfer request to one storage device to perform data transfer. However, the present invention is not limited thereto. It is also possible to transfer data, for example, by the data transfer processor 503 issuing a read request to the source storage device and a write request to the destination storage device.

It is desirable that status information of the virtual volume management information 520 can be set or updated by the volume manager 401 of the managing unit 4.

FIG. 9 shows an example of a frame data transfer process which is performed by the routing processor 501 of the virtualization controller 2. This process starts when the virtualization controller 2 receives frame data from a host computer 1 or storage device 3 (100). The routing processor 501 decides whether virtualization is needed or not, using information for identifying the frame data source/destination included in the frame data (source Port ID, destination Port ID, etc.), and if necessary, the frame data type information included in the frame data and various information (destination LUN, etc.) in the frame payload (101). In this example, if the destination Port ID or LUN is registered in the virtual volume management information 520 of the volume mapping information 515, then the frame data is decided to need virtualization.

If virtualization is needed, the virtualization processor 505 performs the virtualization process (102) explained below.

1. When the received frame data is frame data from the host computer which is addressed to a virtual storage device:

The virtualization processor 505 detects the storage device which corresponds to the virtual storage device identified by the destination identification information in the frame data according to the volume mapping information 515. In order to convert the frame data received from the host computer into frame data addressed to this storage device, it converts the destination identification information (S_ID) included in the frame data into Port ID of the storage device. It also converts the CRC in the received frame data into CRC which is based on the new destination identification information. The converted frame data is sent to the storage device 3 through a port 23.

2. When the received frame data is frame data from the storage device mapped to (correlated with) the virtual storage device, which is addressed to the host computer:

The virtualization processor 505 detects the virtual storage device which corresponds to the frame data source storage device according to the volume mapping information 515. In order to convert the frame data received from the storage device into frame data from this virtual storage device, it replaces the source identification information (S_ID) in the frame data by Port ID of the virtual storage device. It also replaces the CRC in the frame data by CRC which is based on the new source identification information. The frame data whose source identification information and CRC have been replaced is sent to the host computer 1 through a port 23.

At the step of making a decision on the need for virtualization as shown in FIG. 9 (101), if the routing processor 501 decides that virtualization is not needed, the real routing processor 504 performs routing of the received frame data according to the routing information 514 (103).

Figure 10:
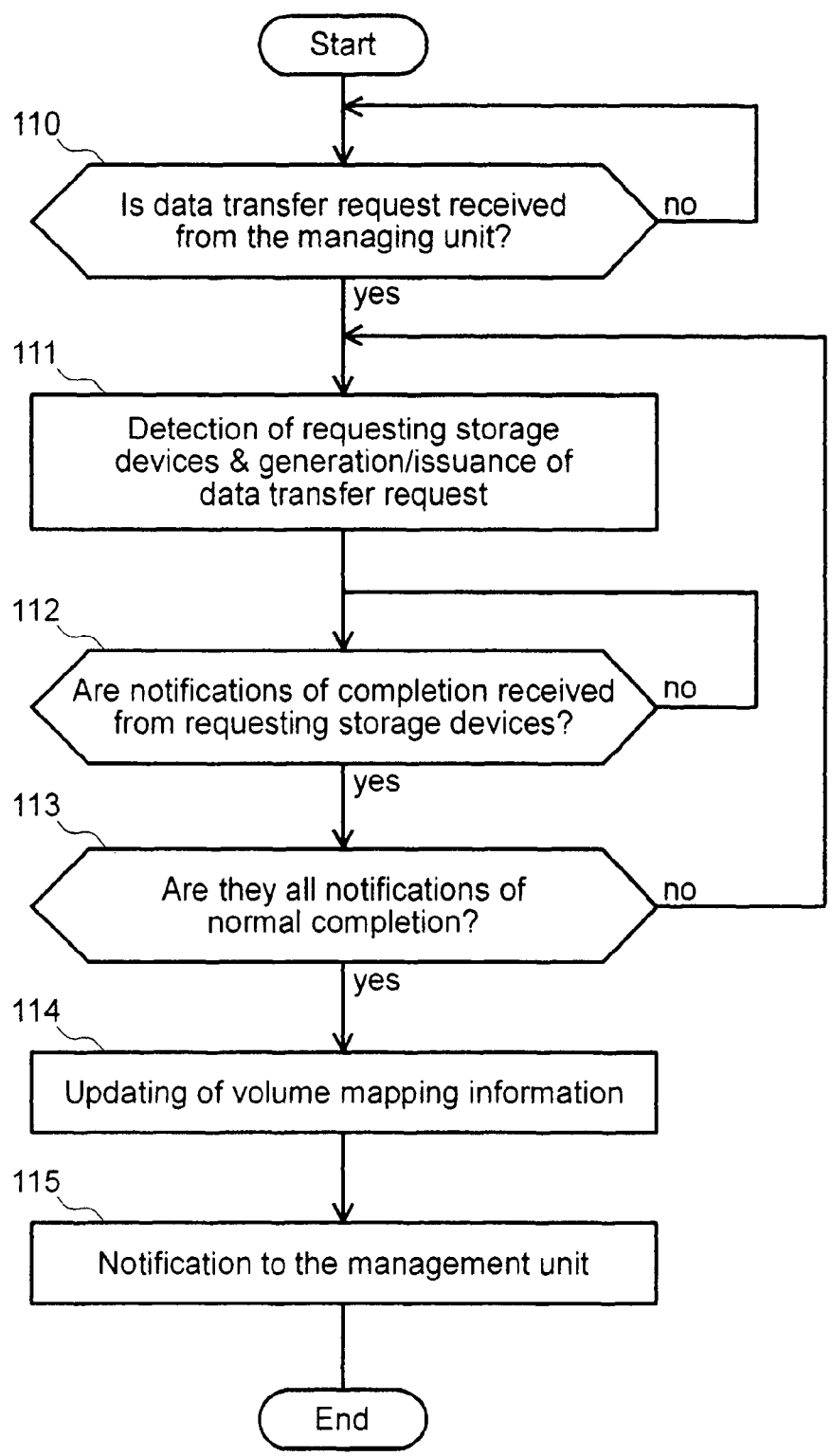
FIG. 10 shows an example of the process which is performed by the data transfer processor of the virtualization controller according to the first embodiment.

FIG. 10 shows an example of a data transfer process which is performed by the data transfer processor 503 of the virtualization controller 2.

The data transfer process starts when the virtualization controller 2 receives a data transfer request from the managing unit 4 (110). The data transfer processor 503, which has received the data transfer request, generates data transfer control information 513 according to information which indicates the data transfer source and destination real volumes. The data transfer control information at least has information for identifying the data transfer source and destination real volumes (Port ID, LUN, etc.). The data transfer processor 503 issues an access request (request for data transfer) to the storage device 3 having the source real volume according to the data transfer control information 513 (111).

After issuance of the data transfer request, the data transfer processor 503 waits for notification of completion from each storage device 3 issuing an access request (112). The data transfer processor 503 confirms whether or not the notifications of completion from the storage devices 3 issuing data transfer requests are all notifications of normal completion (113). If the data transfer processor 503 receives a notification of abnormal completion, it is desirable for the data transfer processor 503 to repeat the steps from issuance of an access request (data transfer request) (111) to confirmation of notification of normal completion (113) for the storage device issuing the notification of abnormal completion.

If the data transfer processor 503 receives notifications of normal completion from all the storage devices 3 issuing data transfer requests, then the data transfer processor 503 registers the data transfer destination real volume in the virtual volume management information 520, updates the status information of the virtual volume management information (114) and notifies the managing unit 4 of completion of the data transfer process (115).

In the data transfer process shown in FIG. 10, when the source storage device 3 which receives the data transfer request from the virtualization controller 2 has the following functions, it is guaranteed that the access requests to the source real volume have all been completed when the status information of the virtual volume management information 520 is updated.

If the source storage device 3 receives a write command from the host computer 1 during the data transfer process, it writes data in the recording medium 35 according to the write command and stores the written data in a temporary storage area (escape volume). The escape volume is a storage area in the recording medium of the storage device 3. As part of the data transfer process, the source storage device 3 sends the data stored in the escape volume to the destination storage device 3. Therefore, when the source storage device 3 notifies the data transfer processor 503 of the virtualization controller 2 of completion, there is no uncompleted command for the source real volume and the data revised by writing during the data transfer process has already been sent to the destination storage device. Hence, it is guaranteed that when the data transfer processor 503 updates the virtual volume management information 520, the access requests to the source real volume have all been processed. In this way, data coherence is ensured when data is transferred between real volumes and the real volume mapped to the virtual volume is changed from the source real volume to the destination real volume.

With the abovementioned data transfer process, the virtualization controller 2, which controls data transfer between storage devices, reduces the processing load required of data transfer, by utilizing the functions of the individual storage devices.

Another approach to ensuring data coherence is to use the following method. An entry for registration of a received command is provided for each real volume in the volume mapping information 515 of the virtualization controller 2. Each time the routing processor 501 of the virtualization controller 2 receives a command addressed to the storage device 3 from the host computer, it registers the content of the command in the entry for the real volume to which this command is addressed. When the virtualization controller 2 receives, from the storage device, notification of completion of a process depending on the command, the routing processor 501 deletes the command registered in the volume mapping information 515. On condition that the volume mapping information 515 thus enables the virtualization controller 2 to know the existence of an uncompleted command if any, the data transfer processor 503 of the virtualization controller 2 sends a data transfer request to the storage device 3, then the routing processor 501 of the virtualization controller 2, which has received a command to the virtual volume as the object of data transfer from the host computer 1, temporarily stores this command in the recording medium 52 of the virtualization controller 2. Then, when the virtualization controller 2 receives notification of completion of data transfer from the source storage device 3, the routing processor 501 of the virtualization controller 2 forwards the command stored in the recording medium 52 to the destination real volume. This approach reduces the time required from when the virtualization controller 2 sends a data transfer request to the source storage device 3 until it receives notification of completion of data transfer from this storage device 3.

As stated earlier, after the data transfer processor 503 updates the status information of the virtual volume management information 520, an access request to a virtual volume or data transmission according to an access request is executed on a real volume whose status information in the virtual volume management information 520 is "Active."

As discussed so far, for data transfer between storage devices under virtualization control, the virtualization controller 2 updates the volume mapping information 515 so that, without the need for revising the information for identifying the virtual volume which the host computer 1 recognizes as the object of access, the real volume mapped to the virtual volume can be dynamically changed. Therefore, the host computer 1 continues processing for access to the virtual volume without knowing that data transfer between the storage devices (real volumes) has taken place.

In the above embodiment, data coherence is ensured by using the function of the storage device 3 (source) which has received the data transfer request from the virtualization controller 2 (data coherence here implies that when the virtual volume management information 520 is updated, all access requests to the former real volume have been completed). However, the present invention is not limited thereto.

Next, an explanation will be given below of a method which only uses the function of the virtualization controller 2 to detect that all access requests to the former real volume have been completed, as a variation of the above data transfer process.

In this method, an entry for registration of a received command is provided for each real volume. Each time the virtualization controller 2 receives a command addressed to a virtual volume or real volume 3 from the host computer, it registers the content of the command in the entry for the real volume to which this command is to be forwarded. When the virtualization controller 2 receives, from a storage device, status information on completion of a process depending on the command, it deletes the command registered in the volume mapping information 515. The command itself registered in the entry is held in the recording medium 52 of the virtualization controller 2.

When the virtualization controller 2 sends a data transfer request to the storage device 3, it registers the command for the virtual volume as the object of data transfer, in the entry for the destination real volume. After sending the data transfer request, if the virtualization controller 2 detects status information on completion of a data write command from the source storage device 3, it does not delete the command registered in the volume mapping information but registers only information on completion of the process for the command in the volume mapping information.

On condition that there is no uncompleted command for the source real volume (on condition that information on completion of processing is registered for all commands registered in the volume mapping information 515 which concerns the source real volume), the virtualization controller 2 updates the data between the source real volume and the destination real volume according to the data write command held temporarily by the virtualization controller 2 (undeleted command for which information on completion has been registered in the volume mapping information 515).

In other words, for data updating done in the source real volume according to the write command after sending the data transfer request to be reflected in the destination real volume, the virtualization controller 2 controls the source and destination storage devices in a way to write the data updated in the source real volume into the destination real volume.

Furthermore, when updating of data between the source and destination real volumes is completed, the virtualization controller 2 sends the destination real volume the command for the virtual volume (registered in the volume mapping information 515) which it has received after sending the data transfer request.

In the data transfer process, it is also acceptable that the virtualization controller 2 monitors the data write command which is being processed. For example, if writing operation according to a write command issued to the source real volume before issuance of a data transfer request is not performed yet even after start of the data transfer process (transfer of write data between the source storage device and the virtualization controller 2 according to the write command is not started), the virtualization controller 2 aborts the writing operation for the source real volume. Namely, the virtualization controller 2 issues a request for canceling the write command issued to the source real volume, to that real volume and the same write command as the cancelled write command is issued to the destination real volume after completion of data transfer. This permits data transfer with reduced overhead.

Even when the real volume mapped to the virtual volume is changed, the abovementioned method ensures data coherence between the former real volume and the new real volume.

Figure 11:
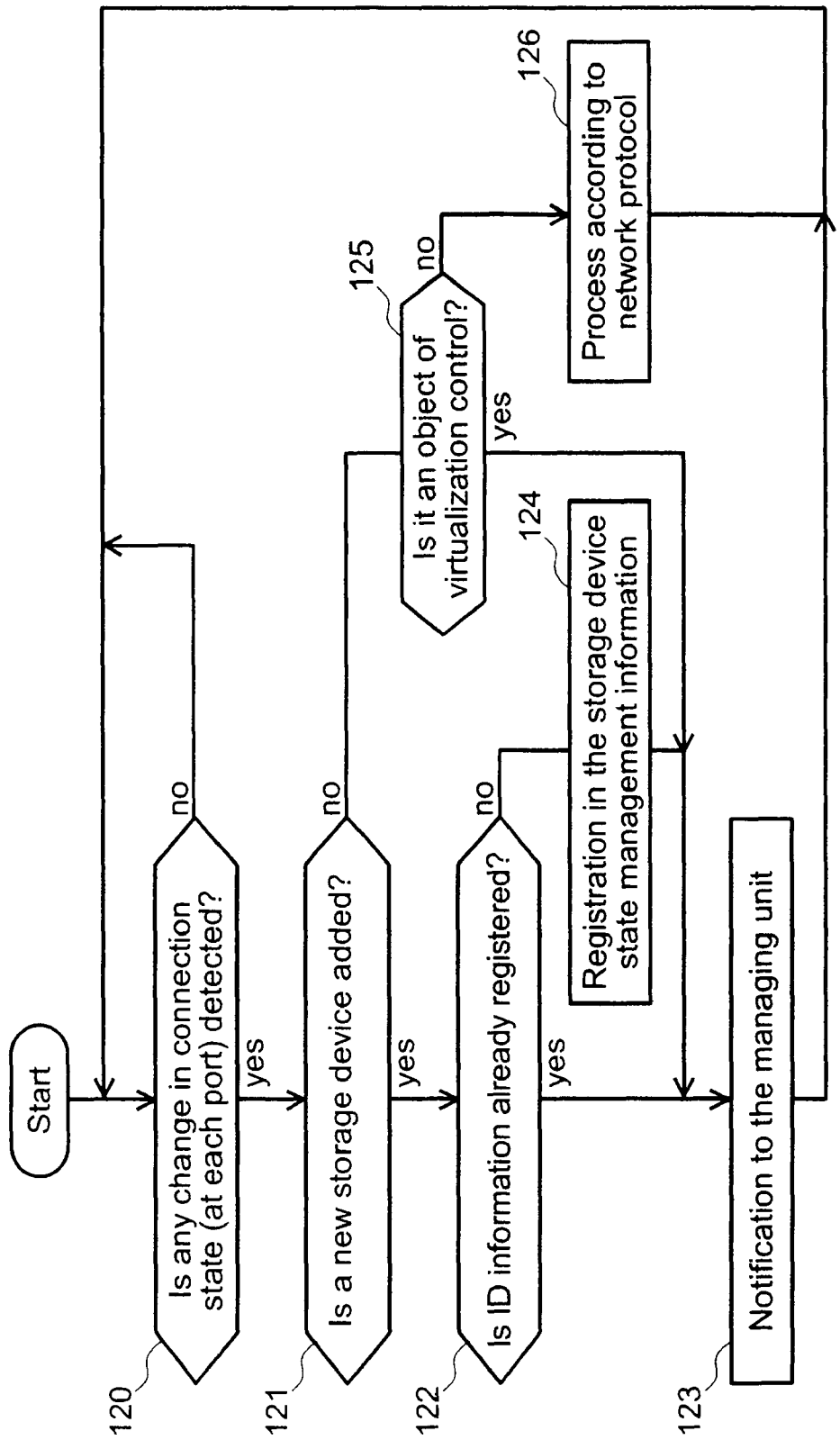
FIG. 11 shows an example of the process which is performed by the storage device monitor of the virtualization controller according to the first embodiment.

FIG. 11 shows an example of the process of monitoring the storage device connection state by the storage device monitor 502 of the virtualization controller 2. The storage device monitor 502 of the virtualization controller 2 monitors the connection state of a storage device connected with a port 23. When it detects a change in the connection state, it starts the process shown in FIG. 11 (120).

Each of the storage devices 3 connected with the virtualization controller 2 stores software for notifying the virtualization controller 2 of its status, in its own memory. As this software is executed by the CPU 30 of the storage device, the storage device sends the storage device monitor 502 of the virtualization controller 2 management information such as Node Name, Port Name, Port ID, LUN and Size of the real volume of the storage device. Therefore, the storage device monitor 502 can detect the connection state from the management information received from the storage device. When the storage device is connected with a port 23, the virtualization controller 2 can detect it; and when the storage device is disconnected from the port 23, the virtualization controller 2 can also detect it. In this way, the storage device monitor 502 detects the state of connection between the port and storage device on its own and can detect a change in the state of connection.

Once the storage device monitor 502 has detected a change in the state of connection, it decides whether the change in the state of connection is caused by the addition of a new storage device or other reason (for example, disconnection between the port 23 and storage device) (121).

If a new storage device has been added, the storage device monitor 502 obtains from this storage device the following information for identifying the port of the storage device: Node Name (unique to each device), Port ID (unique in the network), Port Name (unique to each port), LUN (Logical Unit Number, unique in the storage device) as management information for a real volume which is managed by the storage device, and so on. The storage device monitor 502 decides whether Node Name, unique to each storage device, and Port Name, an identifier unique to each storage device port, have already been registered in the storage device state management information 512 (122) and carries out the following steps according to the result of the decision.

If the obtained Node Name and Port Name have already been registered in the storage device state management information 512, the storage device monitor 502 notifies the managing unit 4 that the storage device whose ID has been registered is connected (123) and concludes the series of steps for storage device monitoring. If Port ID (unique in the network) correlated with the Node Name and Port Name obtained from the storage device has already been registered in the storage device state management information 512 by the managing unit 4, it is desirable for the virtualization controller 2 to set this registered Port ID on the storage device. On the other hand, if such Port ID has not been registered, it is desirable for the virtualization controller 2 to assign and set Port ID to the storage device and register the Port ID set on the storage device, in the storage device state management information 512 and notify the managing unit 4 of this Port ID. If the real volume management information which the storage device monitor 502 has obtained from the storage device is different from the management information registered in the storage device state management information 512, the storage device monitor 502 updates the storage device state management information 512 using the obtained management information and notifies the managing unit 4 of the updating.

If the Node Name and Port Name which the storage device monitor 520 has obtained from the storage device have not been registered in the storage device state management information 512, the storage device monitor 502 registers the obtained information in the storage device state management information 512 (124) and notifies the managing unit 4 (123) and concludes the series of steps for storage device monitoring.

If the storage device monitor 502 decides that the change in the connection state is caused by a reason other than addition of a new storage device (for example, deletion of a storage device) at step 121, the storage device monitor 502 decides whether the storage device whose connection state has changed is an object of virtualization control or not (125), and carries out the following steps according to the result of the decision.

If the storage device is to be under virtualization control, the storage device monitor 502 notifies the managing unit 4 of the detected change in the connection state (123) and concludes the series of steps for storage device monitoring. If it is not to be under virtualization control, the storage device monitor 502 carries out a prescribed process according to the network protocol (for example, RSCN (Registered State Change Notification) in Fibre Channel)) (126) and concludes the series of steps for storage device monitoring.

With the abovementioned steps, the virtualization controller 2 monitors the connection state of each storage device 3 connected with the virtualization controller 2, and notifies the managing unit of a change in the connection state, if any. In addition, it can control notification of connection state change according as whether each storage device 3 connected with the virtualization controller 2 is to be under virtualization control or not.

Embodiment 2

Identification of a Storage Device Based on Personal Information

In the first embodiment, Port ID and Port Name are used as information for identifying the port 33 of a storage device 3. However, the present invention is not limited thereto. Other information may be used for the same purpose as far as it identifies the port 33 of the storage device 3. In the first embodiment, Node Name is used for identifying the storage device 3. Again other information may be used for the same purpose as far as it identifies the storage device 3. For example, it is possible to use, as information for identifying the storage device 3, an identifier used in the device identification page (83h) of vital product data as prescribed by SCSI (Small Computer System Interface). Also, a vendor-specific identifier (hereinafter called "personal information") may be used as information for identifying a volume.

Next, referring to FIGS. 12 to 14, an explanation will be given below of the data transfer process which is carried out when personal information is used to identify the real volume of the storage device 3 or the virtual volume provided to the host computer by the virtualization controller 2.

FIG. 12 shows an example of volume mapping information 515 which has entries for registration of personal information. As shown in FIG. 12, the real volumes identified by P_Pid.sub.—1 (LUN=0 or 1), P_Pid.sub.—2 (LUN=0) and P_Pid.sub.—3 (LUN=0) have personal information and the corresponding virtual volumes have personal information in the same way as the real volumes.

Here, the personal information assigned to a virtual volume need not coincide with the personal information of the corresponding real volume (for example, while the virtual volume identified by V_Pid.sub.—2 (LUN=0) has personal information "DDD.sub.—01," the corresponding real volume has personal information "BBB.sub.—01.") The personal information assigned to virtual volumes may be generated by the virtualization controller 2 and registered in the volume mapping information 515 as information for identifying the virtual volumes. Even if the real volumes do not have personal information, the virtualization controller 2 can generate personal information for the virtual volumes and register it in the volume mapping information 515. As in the case that the personal information ("AAA.sub.—00") of the virtual volume identified by V_Pid.sub.—2 (LUN=1) is the same as that of the corresponding real volume ("AAA.sub.—00"), a virtual volume may have the same personal information as the corresponding real volume.

In addition, personal information assigned to a virtual volume need not be revised even if the real volume corresponding to the virtual volume is changed and data transfer is performed. For example, personal information "AAA.sub.—01" assigned to V_Pid.sub.—1 (LUN=0, Active) does not coincide with the personal information of the corresponding real volume, "CCC.sub.—01," but coincides with the personal information of the real volume before data transfer, "AAA.sub.—01." This is because the virtual volume identified by V_Pid.sub.—1 (LUN=0, Active) had the same personal information as the corresponding real volume before data transfer and, even after data transfer, inherits the same personal information as that of the source real volume.

Figure 13:
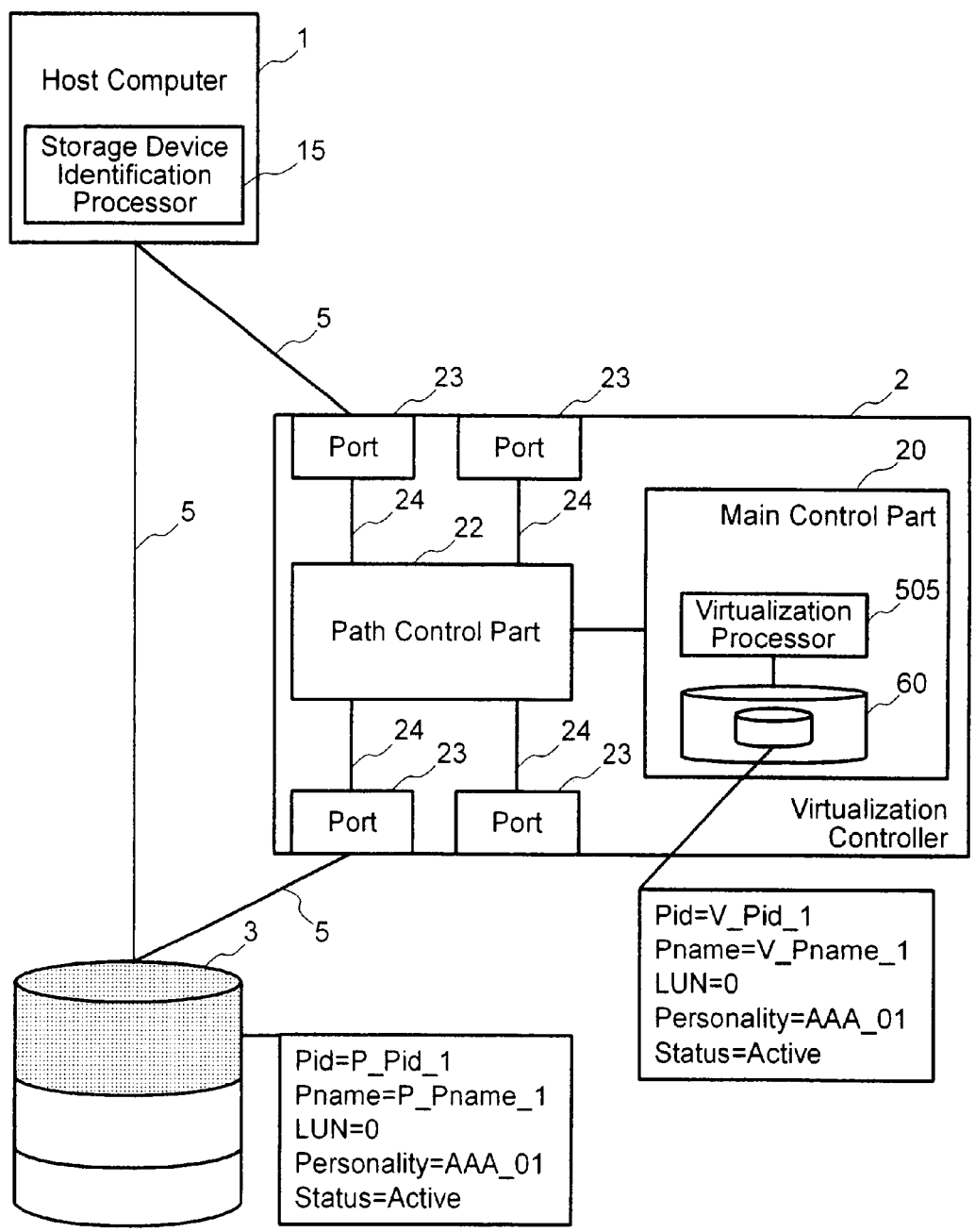
FIG. 13 outlines how the host computer accesses a virtual storage device according to the second embodiment.

FIG. 13 shows a case that the host computer 1 which uses personal information to identify volumes accesses a volume through the virtualization controller 2.

In the second embodiment, the host computer 1 has a storage device identification processor 15 in addition to the same components as those of the first embodiment. The storage device identification processor 15 is implemented in that the CPU 10 executes a program stored in the memory 11 of the host computer 1. It identifies the volume and storage device to be accessed by the host computer, using personal information. In other words, when accessing a storage device, the storage device identification processor 15 requests the storage devices connected through a network to the host computer to send personal information for identifying the real volumes in the storage devices, and receives the personal information from the storage devices. The storage device identification processor 15 checks the personal information received from the storage devices, against the personal information of the real volume to be accessed which is stored in the memory 11 of the host computer 1. The storage device identification processor 15 decides the storage device which has sent the same personal information as that of the real volume to be accessed, to be the storage device to be accessed. Once the storage device to be accessed is identified with the abovementioned storage device identifying process, the host computer 1 issues an access request to the identified storage device.

FIG. 13 shows a case that the host computer 1 accesses the real volume identified by personal information "AAA.sub.—01."

First, let's assume that the host computer 1 is connected to a storage device with no intermediation of the virtualization controller 2. As shown in FIG. 13, the real volume having personal information "AAA.sub.—01" can be accessed through the port of the storage device 3 identified by Port ID=P_Pid.sub.—1, Port Name=P_Pname.sub.—1. The storage device identification processor 14 receives the personal information "AAA.sub.—01" from the storage device 3 which has this port, and thus identifies this storage device 3 as the device to be accessed. Then the host computer 1 issues an access request to the storage device 3 to be accessed, using the source address information (Port ID=P_Pid.sub.—1) and real volume identification information (LUN=0) included in the frame of the received personal information ("AAA.sub.—01"). After this, data transmission from the host computer 1 to the storage device 3 according to the access request is made using the frame containing identification information Port ID=P_Pid.sub.—1, LUN=0.

Next, let's assume that, as shown in FIG. 13, the host computer 1 is connected to a storage device 3 through the virtualization controller 2 and the storage device is to be under virtualization control. The virtualization processor 505 of the virtualization controller 2 assigns a virtual volume to the real volume of the storage device 3 (registers information for identifying a virtual volume correlated with the real volume, in the volume mapping information 515) and, for the virtual volume, sets the same personal information as the personal information "AAA.sub.—01" of the real volume, in the volume mapping information 515.

As a result of the abovementioned operation of the virtualization processor 505, the storage device identification processor 15 of the host computer 1 requests the device connected through the network to send its personal information, and the virtualization controller 2 sends the personal information "AAA.sub.—01" to the host computer 1. Therefore, when the storage device identification processor 15 of the host computer 1 receives the personal information "AAA.sub.—01" from the virtualization controller 2, it decides that the volume to be accessed is the virtual volume of the virtual storage device identified by the source (sender) address information (Port ID=V_Pid.sub.—1) and virtual volume identification information (LUN=0) included in the received frame. Then the host computer sends an access request and data to the virtual volume to be accessed by sending a frame containing identification information Port ID=V_Pid.sub.—1, LUN=0. The frame containing identification information Port ID=V_Pid.sub.—1, LUN=0 is converted by the virtualization routing processor 505 of the virtualization controller 2 into a frame addressed to the real volume identified by Port ID=P_Pid.sub.—1, LUN=0, which is then sent to the storage device 3 having the port identified by Port ID=P_Pid.sub.—1. The steps which are taken after the host computer 1 detects (decides) the storage device to be accessed are the same as those in the first embodiment, so a detailed description of these steps is omitted.

As described above, the storage device identification processor 15 of the host computer 1 can detect the storage device or volume to be accessed, using the personal information "AAA.sub.—01" set on the virtual volume for the virtual post identified by Port ID=V_Pid.sub.—1, Port Name=V_Pname.sub.—1, even when the storage device is under virtualization control of the virtualization controller 2.

In connection with FIG. 13, even if there is a switch dedicated to routing (a switch which does not have the virtualization routing processor 505) between the host computer 1 and the storage device 3, the host computer 1 can recognize a virtual volume as the volume to be accessed, by the same procedure as mentioned above, and the virtualization controller 2 can forward the frame data from the host computer 1 to the real volume corresponding to the virtual volume.

Also, FIG. 13 shows that Port ID (P_Pid.sub.—1) for the real volume is different from Port ID (V_Pid.sub.—1) for the virtual volume. However, the present invention is not limited thereto. Since Port ID can be assigned to the virtual port by the virtualization controller 2, Port ID for a virtual volume may also be the same (namely Port ID=P_Pid.sub.—1) as Port ID of the real port used to access the real volume corresponding to this virtual volume.

Figure 14:
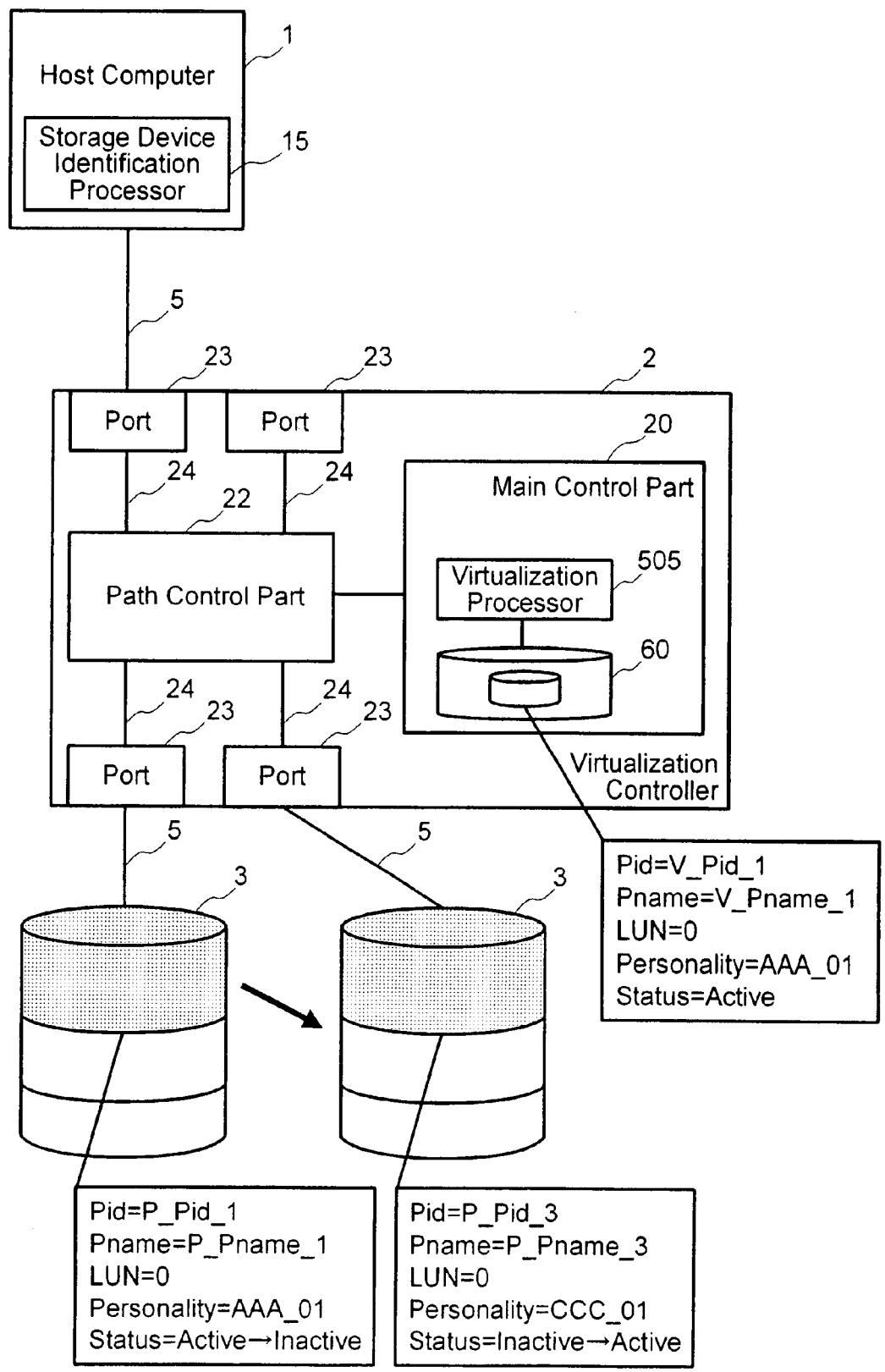
FIG. 14 shows an example of the process of data transfer between storage devices according to the second embodiment.

FIG. 14 shows an example of control of personal information in data transfer between storage devices under virtualization control.

The figure concerns a case that the data stored in the real volume identified by Port ID=P_Pid.sub.—1 and the personal information "AAA.sub.—01" is transferred to the real volume identified by Port ID=P_Pid.sub.—3 and the personal information "CCC.sub.—01." In the case shown in FIG. 14, as personal information of the virtual volume, the same information (AAA.sub.—01) as the personal information of the real volume correlated with the virtual volume is used. After data transfer, even when the real volume correlated with the virtual volume is changed by the data transfer, the virtualization processor 505 of the virtualization controller 2 inherits the personal information "AAA.sub.—01" of the source real volume as the personal information of the virtual volume without any revision.

When the personal information set on the virtual volume before data transfer is inherited after data transfer as explained above, even if the host computer 1 identifies the volume using the personal information, the process of data transfer between the storage devices can be hidden from the host computer 1. Thus, after data transfer, the host computer 1 can identify the volume to be accessed, using the information for identifying the volume to be accessed, which the host computer 1 used before data transfer. As a consequence, even when data transfer between storage devices takes place, the host computer 1 need not stop a process which it is performing and can continue the process. The steps other than the process of inheriting the personal information set on the virtual volume are the same as those in the first embodiment and their description is omitted here.

If the personal information set on the virtual volume is inherited from one virtualization controller to another, the host computer 1 can identify the volume using the personal information while replacement of the virtualization controller is hidden from the host computer 1. As a consequence, the host computer 1 need not stop a process which it is performing and can continue the process. The routing processor 501 of the virtualization controller 2 notifies the volume manager 401 of the managing unit 4 of the personal information of the virtual volume as part of the volume mapping information 515 and stores it in the managing unit 4 as volume mapping management information 411. Hence, when the virtualization controller is replaced, the volume manager 401 of the managing unit 4 notifies the new virtualization controller 2 of the volume mapping management information 411 for the old virtualization controller 2 and sets it in the volume mapping information 515 for the new virtualization controller 2. By doing so, the personal information can be inherited from one virtualization controller 2 to another.

When the virtualization controller is replaced, it is desirable that the virtual port identifier which is managed by the old virtualization controller be also inherited by the new virtualization controller. It is also desirable for the administrator to be able to specify, for the new virtualization controller 2 through the managing unit 4, whether, after data transfer, it inherits the old personal information (or uses the source personal information) without revising the personal information set on the virtual volume or new personal information is set, and so on.

In the second embodiment, it is assumed that the storage devices 3 and the virtualization controller 2 have personal information for each volume (namely personal information is assigned to each volume). However, the present invention is not limited thereto. For example, the storage devices 3 and the virtualization controller 2 may have personal information on a device-by-device basis. Furthermore, although a port is identified by Port ID, Port Name and personal information according to the second embodiment, the invention is not limited thereto. Any method of identifying a port uniquely is acceptable and any combination of various identification information may be used to identify a port.

Figure 17:
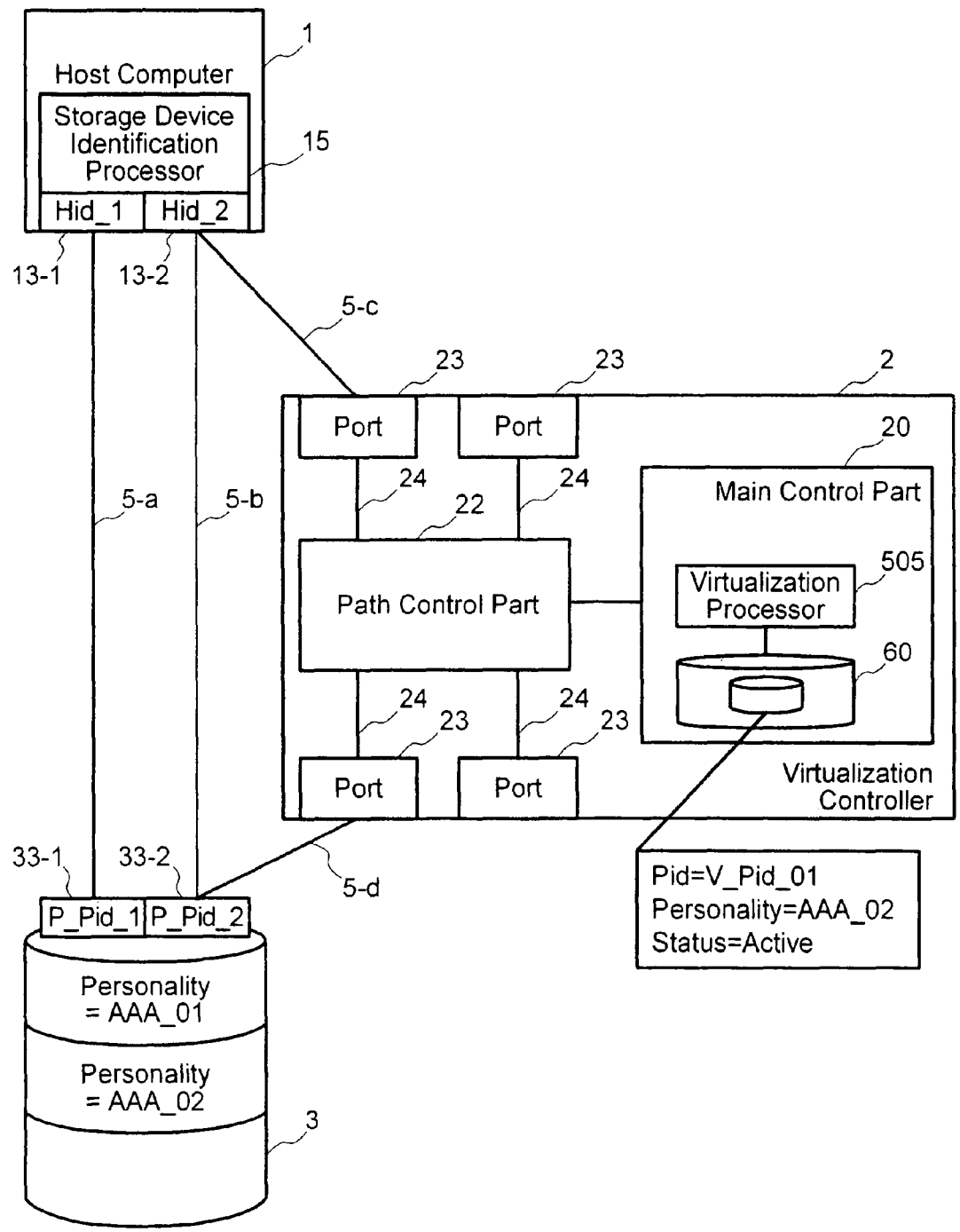
FIG. 17 shows an example of the process which is performed to introduce a virtualization controller in a computer system according to the second embodiment.

FIG. 17 shows the configuration of a computer system in which a host computer and a storage device each have more than one port. The host computer 1 shown in FIG. 17 is different from the one shown in FIG. 13 in that it has a plurality of ports 13 (Hid.sub.—1, Hid.sub.—2). The storage device 3 shown in FIG. 17 is different from the one shown in FIG. 13 in that it has more than one port 33 (P_Pid1, P_Pid2).

Since the storage device has more than one port, when the storage device identification processor 15 of the host computer 1 requests the storage device 3 to send personal information, the same personal information is sent from the ports. The storage device identification processor 15 stores the plurality of ports which have sent the same personal information, in the memory 11 as volume management information.

FIG. 18 shows an example of volume management information stored in the memory 11 of the host computer 1. Volume management information is generated by the storage device identification processor 15 as the host computer 1 receives personal information from the storage devices. Volume management information is generated for each storage device and contains the volume number of the real volume owned by the storage device, the personal information of the real volume, the path used for access from the host computer 1 to the real volume, and the status information of the real volume. Here the path information concerns a primary path and a secondary path. The host computer usually uses the primary path to access the real volume; however, if the primary path is in trouble or disconnected, the host computer can use the secondary path to access the real volume.

Referring to FIG. 17, an explanation will be given below of the process of modifying a computer system in which a host computer is connected with a storage device with no intermediation of a virtualization controller, in a way that a virtualization controller is connected between the host computer and storage device without stopping operation of the host computer and the real volume of the storage device is virtualized by the virtualization controller 2 and the virtual volume is provided to the host computer.

First, let's assume that port Hid.sub.—1 of the host computer 1 is connected via path 5-*a* to port P_Pid.sub.—1 of the storage device 3 and port Hid.sub.—2 of the host computer 1 is connected via path 5-*b* to port P_Pid.sub.—2 of the storage device 3. The volume management information as shown in FIG. 18 is stored in the memory 11 of the host computer 1, and according to this volume management information, the host computer 1 uses the primary path 5-*a* passing through ports Hid.sub.—1 and P_Pid.sub.—1 to access the real volume identified by personal information AAA.sub.—01, and uses the primary path 5-*b* passing through ports Hid.sub.—2 and P_Pid.sub.—2 to access the real volume identified by personal information AAA.sub.—02.

Next are the steps which are taken when the path 5-*b* is disconnected and a virtualization controller 2 is introduced in the abovementioned computer system.

1. Since the path 5-*b* is disconnected, the host computer 1 must change the path for access to the real volume identified by AAA.sub.—02 from the path 5-*b* to the path 5-*a*. So, in order to temporarily stop access to the real volume identified by AAA.sub.—02, the storage device identification processor 15 registers the status information of this real volume in the volume management information as "Inactive." Under the control of the CPU 10 of the host computer, the path for access to the real volume identified by AAA.sub.—02 is switched to the path 5-*a* which is registered as a secondary path in the volume management information. After switching of the paths, the storage device identification processor 15 returns the status information of the real volume identified by AAA.sub.—02 in the volume management information to "Active." The abovementioned process is performed by the CPU 10 according to an instruction which the user of the host computer gives via an input device such as a keyboard. Alternatively, arrangements may be made that the storage device identification processor 15 automatically performs the process. In other words, it is also possible that the storage device identification processor 15 refers to the volume management information and automatically switches from the primary path to the secondary path.

2. Next, the path 5-*b* is disconnected and a virtualization controller 2 is connected between the host computer 1 and the storage device 3. In this case, port Hid.sub.—2 of the host computer 1 is connected via path 5-*c* to port 23 of the virtualization controller 2 and port P_Pid.sub.—2 of the storage device 3 is connected via path 5-*d* to port 23 of the virtualization controller 2.

3. Once the virtualization controller 2 is connected with the computer system, the volume mapping information 515 for the virtualization controller 2 must be set. In this embodiment, in order to specify the virtual volume to be correlated with the real volume identified by AAA.sub.—02 in the storage device 3, the virtualization processor 505 of the virtualization controller 2 registers virtual Port ID (Port ID=V_Pid.sub.—01) and virtual Port Name (Pname=V_Pname.sub.—1) in the volume mapping information 515 in relation to this real volume. The virtualization processor 505 assigns to this virtual volume the same personal information as the personal information AAA.sub.—02 of the corresponding real volume, which is registered in the volume mapping information 515. The volume mapping information is set according to input information which the managing unit 4 receives from the user. In other words, the information which the managing unit 4 receives from the user is sent to the virtualization processor 505 of the virtualization controller 2 under the control of the volume manager 401 and the virtualization processor 505 sets volume mapping information according to that information.

4. After the volume mapping information 515 has been set, the host computer 1 receives an instruction from the user and requests other devices connected with it to send their personal information. The virtualization controller 2, which has received this request, sends personal information AAA.sub.—02 to the host computer.

5. The host computer 1, which has received the personal information AAA.sub.—02 from the virtualization controller 2, knows from the sender address (Port ID=V_Pid.sub.—01, etc.) included in the received frame that it has received personal information from a new device. Then, again the storage device identification processor 15 changes the status information of the real volume identified by AAA.sub.—02 to "Inactive." And it changes the primary path for access to the real volume identified by AAA.sub.—02 as registered in the volume management information from the path passing through port Hid.sub.—2 and port P_Pid.sub.—2 to the path passing through port Hid.sub.—2 and port V_Pid.sub.—01 (virtual port), according to the sender address included in the received frame. Under the control of the CPU 10 of the host computer, this new primary path is now used to access the real volume identified by AAA.sub.—02. After switching of the paths, the storage device identification processor 15 returns the status information of the real volume identified by AAA.sub.—02 to "Active."

Though the volume management information including status information for each volume is shown above, the volume management information can include different types of status information. For example, status information for each access pass (i.e., status information for a primary pass and status information for a secondary pass), which indicates whether or not a real volume can be accessed via each access pass, can be included in the volume management information. Then storage device identification processor 15 can decide which access pass can be used to access the real volume according to the status information. If the host computer has a storage device manager similar to the one which the managing unit 4 has, the host computer can maintain such status information in the volume management information. Once the abovementioned steps have been taken, even after the host computer 1 is connected with the virtualization controller 2, it can identify the real volume of the storage device using the same personal information (AAA.sub.—02) as before connection of the virtualization controller 2. Therefore, even when the virtualization controller 2 is newly introduced in the computer system and the host computer issues an access request to the virtual volume, there is no need to set new personal information on the host computer. For this reason, the host computer need not stop a process which it is performing.

Embodiment 3

(Plurality of Storage Devices Constitute One Virtual Volume)

In the first and second embodiments, one real volume constitutes one virtual volume. However, the present invention is not limited thereto and also applicable to a case that plurality of real volumes constitute one virtual volume.

Figure 16:
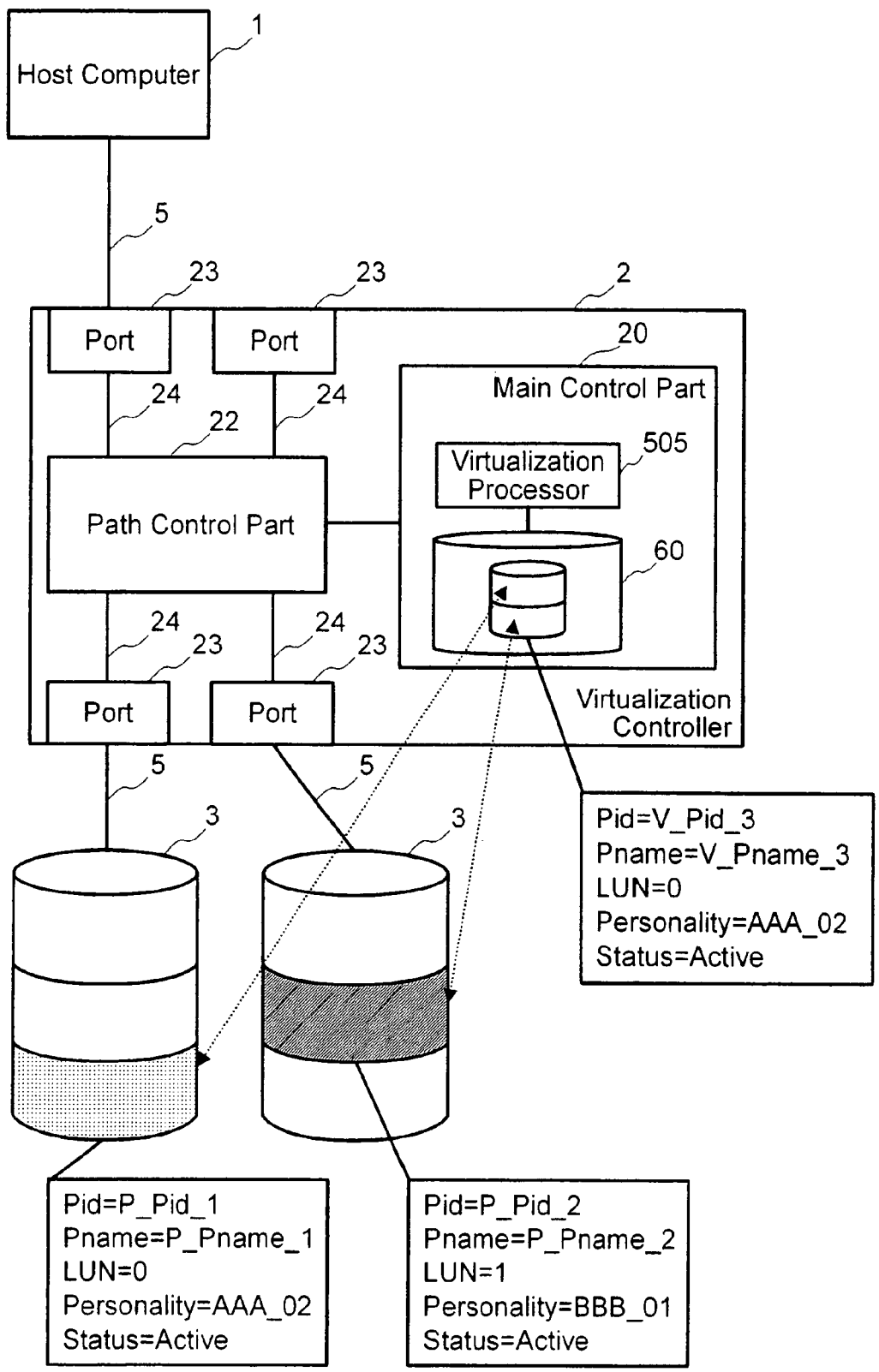
FIG. 16 shows how a virtual volume is configured according to the third embodiment, as an example.

Referring to FIGS. 15 and 16, an explanation will be given below of the case that a plurality of real volumes constitute one virtual volume.

FIG. 15 shows an example of volume mapping information 515 where the real volume identified by Port ID=P_Pid.sub.—1, Port Name=P_Pname.sub.—1, LUN=3 (5 GB) and the real volume identified by Port ID=P_Pid.sub.—2, Port Name=P_Pname.sub.—2, LUN=1 (5 GB) constitute one virtual volume identified by Port ID=P_Pid.sub.—3, Port Name=P_Pname.sub.—3, LUN=0 (10 GB). The volume management table (FIG. 15) is the same as the one shown in FIG. 12 except that two real volumes are assigned to one virtual volume and address information for the real volumes is added as an entry to the virtual volume management information 520. In the case shown in FIG. 15, the personal information of the real volume identified by Port ID=P_Pid.sub.—1, Port Name=P_Name.sub.—1, LUN=3 is used as the personal information of the virtual volume identified by Port ID=V_Pid.sub.—3, Port Name=V_Pname.sub.—3, LUN=0.

FIG. 16 shows an example of a computer system in which two real volumes constitute one virtual volume. In the computer system shown in FIG. 16, the virtualization controller 2 takes the same steps to deal with data transfer and storage device monitoring as in the first and second embodiments, so only the routing process is explained below.

The routing process begins when the virtualization controller 2 receives frame data from the host computer 1 or storage device 3. The routing processor 501, which has received the frame data, decides whether virtualization is needed or not, using source (sender)/destination (receiver) identification information in the frame data, and if necessary, frame data type and various information (LUN, etc.) as payload in the frame. In a specific example, if the source/destination identification information (Port ID, etc.) and information in the frame payload (LUN) are registered in the virtual volume management information 520 of the volume mapping information 515, the routing processor 501 decides that virtualization is needed.

If the routing processor 501 decides that virtualization is needed, the virtualization processor 505 carries out the following steps for virtualization.

1. When the received frame data is frame data addressed to a storage device from the host computer:

The virtualization processor 505 decides whether the received frame data is a read/write access request or not. If the frame data is a read/write access request, the virtualization processor 505 identifies the storage device corresponding to the virtual storage device to which the frame data is addressed, according to the volume mapping information 515 and address and data length information in the access request information (payload in the received frame in particular). Then, in order to convert the received frame into a frame for the identified storage device, the destination identification information (D_ID) in the frame data and CRC are replaced by destination identification information indicating the port of the identified storage device, and CRC which is based on the new destination identification information. Furthermore, if necessary, new address information and data length information are generated as access request information. The new frame as a result of conversion is sent to the storage device 3 through a port 23 of the virtualization controller 2. If the access request is to be sent to two storage devices (request for access across address 989680h), the virtualization processor 505 generates an access request for each of the storage devices and sends the request to each storage device.

If the frame data received by the virtualization controller 2 is data (write data) other than a read/write access request, the virtualization processor 505 identifies the storage device corresponding to the virtual storage device to which the frame data is addressed, according to the volume mapping information 515 and, if necessary, address and data length information as the write access request information which the virtualization controller 2 received before reception of the write data, and write data offset information. Then, in order to convert the received frame into a frame for the identified storage device, the virtualization processor 505 replaces the destination identification information (D_ID) in the frame data and CRC by identification information for the identified storage device, and new CRC which is based on this identification information. The virtualization controller 2 sends the frame to the identified storage device 3 through a port 23.

2. When the received frame data is frame data addressed to the host computer from a storage device mapped to a virtual storage device:

The virtualization processor 505 decides whether the received frame data is a read data or not, and takes steps depending on the type of frame data. For example, if the frame data is read data, the virtualization processor 505 identifies the virtual storage device corresponding to the storage device which has sent the frame data. Then, in order to convert the received frame into a frame from the identified virtual storage device, the virtualization processor 505 replaces the source (sender) identification information (S_ID) in the frame data and CRC by identification information for the virtual storage device, and CRC which is based on the new destination identification information. The virtualization controller 2 sends the frame to the host computer 1 through a port 23.

When two storage devices send read data according to one read access request simultaneously, it is desirable that until forwarding of the data received from one storage device to the host computer is completed, the virtualization controller 2 suspend forwarding of the read data received from the other storage device. For example, if the virtualization controller 2 receives read data from the storage device with the real volume identified by $P\_Pid.sub.$—1, $P\_Pname.sub.$—1, LUN=3 (5 GB) and the storage device with the real volume identified by $P\_Pid.sub.$—2, $P\_Pname.sub.$—2, LUN=1 (5 GB), the virtualization controller 2 temporarily stores the read data from the storage device with the real volume identified by $P\_Pid.sub.$—2, $P\_Pname.sub.$—2, LUN=1 (5 GB) to suspend forwarding of the read data. Moreover, when two storage devices send response data according to one read access request, the virtualization controller 2 generates one response data based on the two response data received from the two storage devices, and sends the generated response data to the host computer.

In the abovementioned computer system in which more than one real volume constitute one virtual volume, data can be transferred between storage devices under virtualization control without revising the identification information for the volume which the host computer recognizes as the volume to be accessed, as in the first and second embodiments. More specifically, like the first and second embodiments, as data transfer is done between storage devices, the virtualization controller 2 updates the volume mapping information 515 and changes the real volume correlated with the virtual volume from the data transfer source real volume to the data transfer destination real volume, so the real volume mapped to the virtual volume is dynamically changed without revising the identification information for the volume which the host computer 1 recognizes as the volume to be accessed. Thus, the host computer 1 can continue its operation without knowing the data transfer which takes place between storage devices (real volumes).

Embodiment 4

(Intelligent Ports Provide Virtualization Control and Storage Functions)

In the above embodiments, the main control part 20 of the virtualization controller 20 which functions as a switch executes all processes according to the present invention. However, the present invention is not limited thereto. Alternatively, it is possible that each of the ports 23 has a processor which performs the routing task.

Furthermore, the virtualization controller 2 is not limited to one which only incorporates ports 23, a path control part 22 and a main control part 20. For example, like a disk array controller in a disk array system, it is possible to control the system in a way that a host computer recognizes plural physical disk devices as a single logical storage. Another approach is that the virtualization controller 2 has a storage control function as follows: parity data as redundant data is added to the data being accessed by a host computer and the data is stored on a disk and the virtualization controller 2 has a storage control part to perform parity control and other related tasks to enable data transfer with the host computer using the parity data even if a disk device fails. It is also possible that the virtualization controller 2 has the function as a storage (storage function) by incorporating a storage control part and a storage group composed of plural storages such as disk devices.

Next, referring to FIGS. 19 to 22, an explanation will be given concerning a case that the virtualization controller has a storage control part and a storage group to provide a storage function and its constituent parts or components process their respective tasks.

Figure 19:
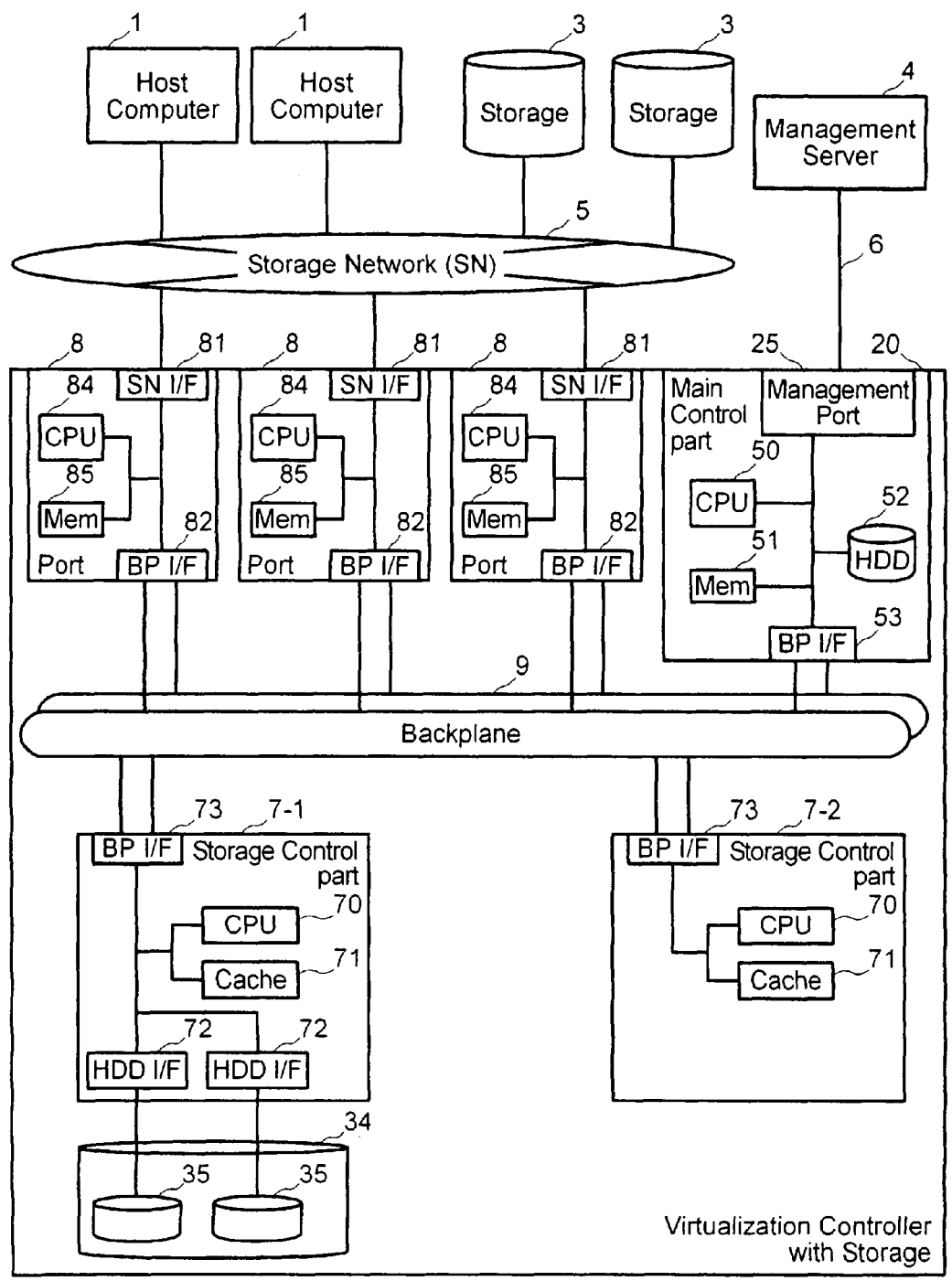
FIG. 19 shows an example of a computer system according to the fourth embodiment.

FIG. 19 shows an example of a computer system according to the present invention. The components other than the virtualization controller 2 are the same as those shown in FIG. 1. In the virtualization controller 2, one or more port sections 8, and one or more storage control parts 7-1, 7-2, and the main control part 20 are connected through a backplane 9, and the storage control part 7-1 is connected with plural disk devices 35. Each port section 8 incorporates: an interface control part 81 (SN I/F in the figure) which controls a network 5 connected with host computers 1 or storage devices 3; an interface control part 82 (BP I/F) which controls the backplane 9 for connection with other components inside the virtualization controller 2; a memory 85 which stores programs and information (discussed hereinbelow); and a CPU 84 which executes the program using such information. The storage control part 7-1 incorporates: an interface control part 73 (hereinafter called BP I/F) which controls the backplane 9; an interface control part 72 for data transfer with plural disk devices 35 (hereinafter called "HDD I/F"); a cache 71 which stores data to be transferred from/to the disk devices 35 or storage devices 3; and a CPU 70 which performs relevant tasks and executes the programs (discussed hereinbelow). The storage control part 7-2 is structurally the same as the storage control part 7-1 except that it does not have an interface control part 72 for data transfer with disk devices 35. The main control part 20 is the same as the main control part 20 shown in FIG. 1 except that it includes a management port 25 and has an interface control part 53 for control of the backplane 9. The program to be executed by the CPU 50 will be discussed hereinbelow.

Although FIG. 19 shows a case in which host computers 1, storage devices 3, a management server (managing unit) 4, and port sections 8 in the virtualization controller 2 each have one port, the invention is not limited thereto. Each of them may have more than one port. Likewise, the components which constitute the virtualization controller 2 may each have more than one interface control part 82 (BP I/F) for control of the backplane 9 and in that case, it is desirable that the components should be interconnected through plural backplanes. Since the port sections 8 of the virtualization controller 2 are compatible with different network protocols, they may be used as management ports.

Figure 20:
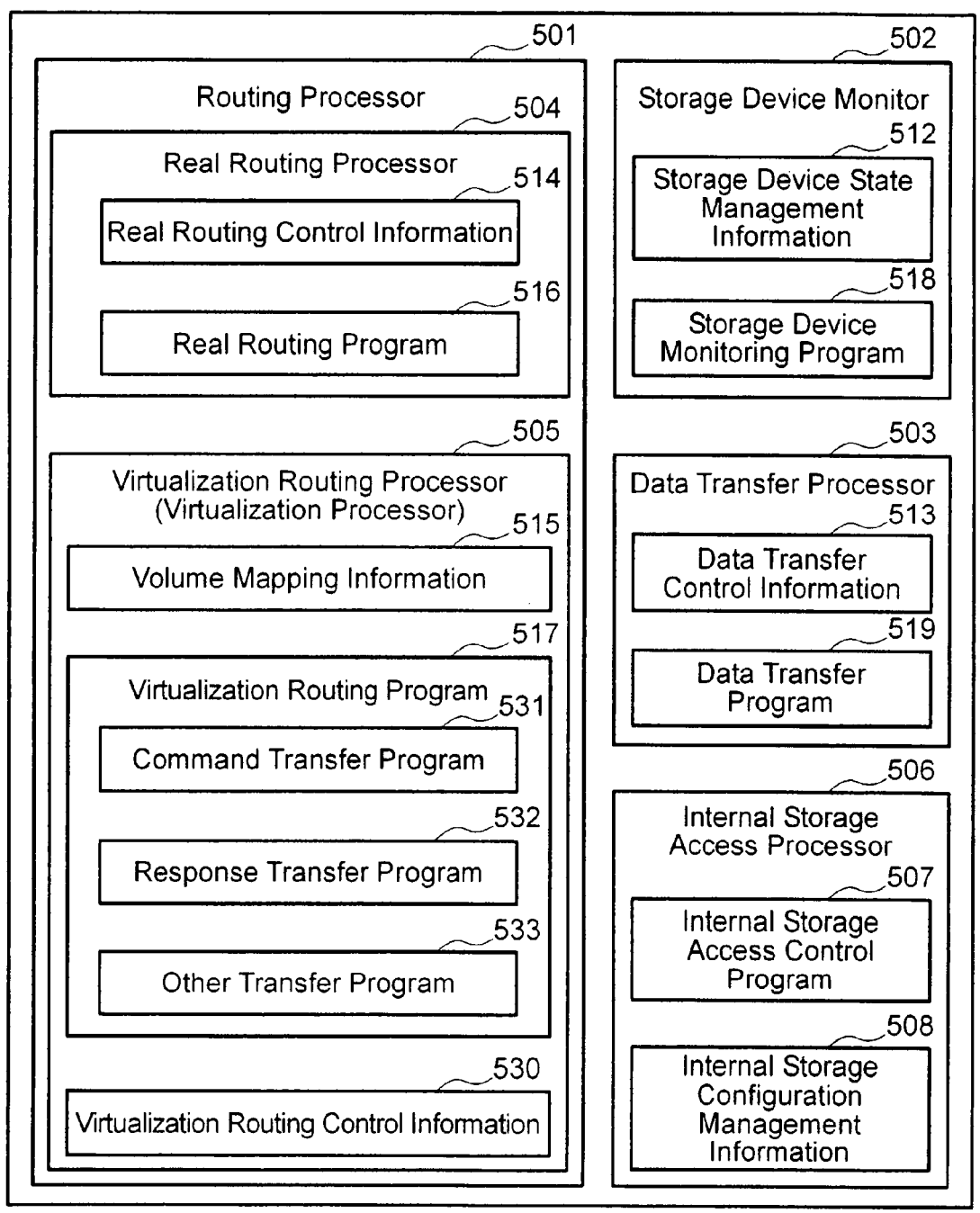
FIG. 20 shows an example of programs and information which are stored in the storage medium of the virtualization controller according to the fourth embodiment.

FIG. 20 shows programs to be executed by the CPU in a component of the virtualization controller 2 and an example of management information. The programs and management information shown here are the same as those in FIG. 3 except for the following three points. Firstly, the virtualization processor 505 newly has virtualization routing control information 530. Secondly, the virtualization routing program 517 has a program for transfer of command frames (command transfer program) 531, a program for transfer of response frames (response transfer program) 532, and a program for transfer of other frame data (other transfer program) 533.

Thirdly, the virtualization controller 2 newly has an internal storage access processor 506 which holds internal storage configuration management information 508 as information on the configuration of storage devices 35 in the virtualization controller 2, and an internal storage access control program 507 for actually transferring frame data.

It is desirable that the internal storage access processor 506 should control the system in a way that a host computer recognizes plural physical disk devices as a single logical storage device, and also by adding parity data as redundant data to the data being accessed by the host computer and storing it on a disk, the internal storage access processor 506 can perform parity control and other related tasks to enable data transfer with the host computer using the parity data even if a disk device fails. However, this is not directly related to the present invention and a detailed explanation thereof is omitted here. Details of the virtualization routing control information 530, command transfer program 531, response transfer program 532 and other transfer program 533 will be given later.

In FIG. 3 and FIG. 20, a program or the like for initialization of the virtualization controller 2 is not shown. The virtualization controller 2 may have at least an initialization program to initialize various management information upon turning on the power or a group of programs which initialize the system or carry out diagnosis according to an instruction from the managing unit (management server) 4 or the like.

Figure 21:
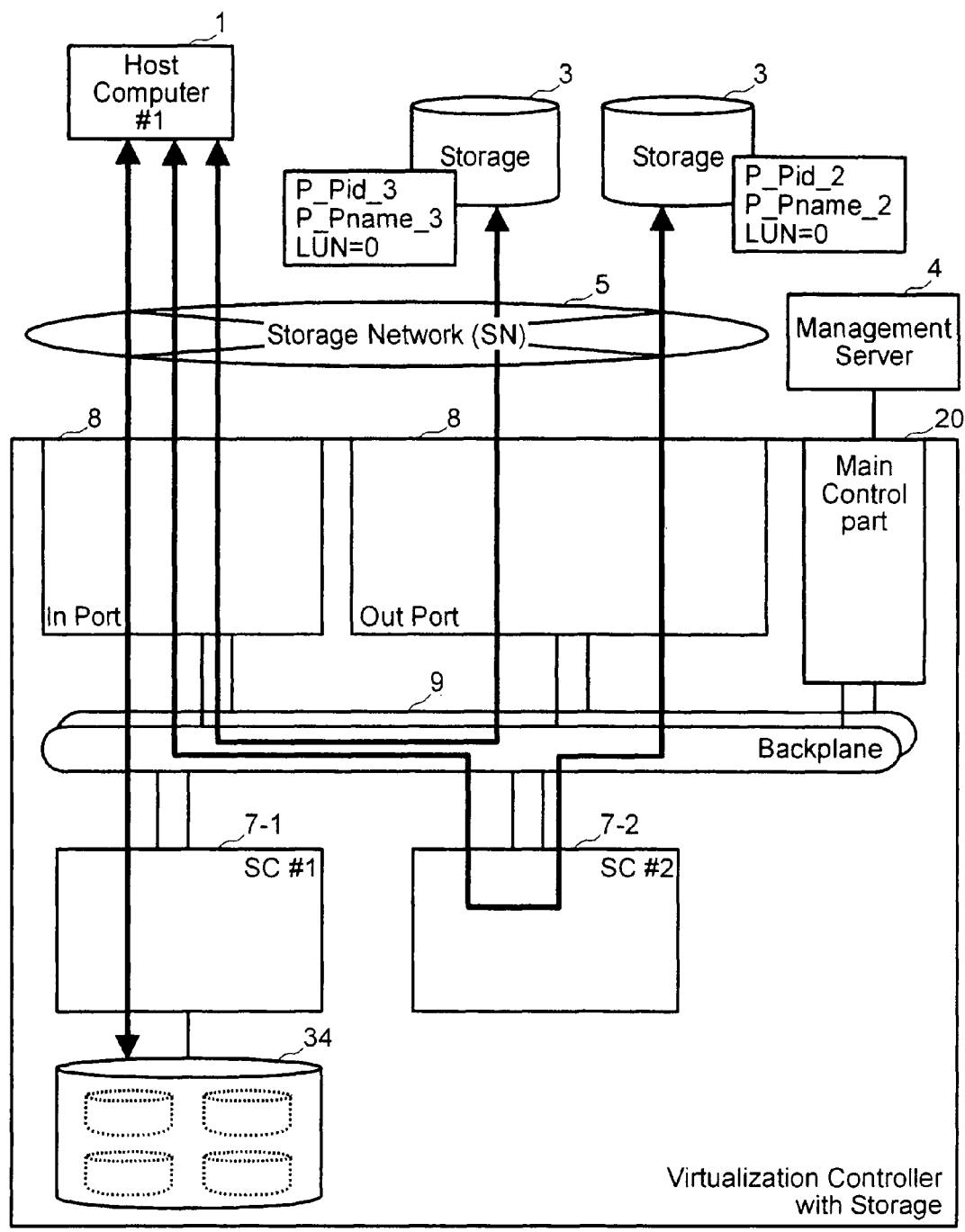
FIG. 21 shows different access paths between a host computer and a storage according to the fourth embodiment.

FIG. 21 shows three major types of access path between a host computer and a storage device. In connection with the figure, a storage group 34 as a component of the virtualization controller 2 is referred to as an internal storage, and storage devices 3 which are connected through the network 5 with the virtualization controller 2 as external storages; and the port section 8 connected with the host computer 1 is called In Port and the port section 8 connected with external storage devices 3 is called Out Port. The first type of access path is a route which connects the host computer 1 with the internal storage 34 through the port section 8 (In Port) and the storage control part 7-1. The second type of access path is a route which connects the host computer 1 with an external storage 3 through the port section 8 (In Port), the storage control part 7-2 and the port section 8 (Out Port). The third type of access path is a route which connects the host computer 1 with an external storage 3 through the port section 8 (In Port) and the port section 8 (Out Port).

FIG. 22 is a table showing an example of volume mapping information 515 which is used in this embodiment. The difference from the table in FIG. 4 is that this table newly includes virtualization module management information 523 which manages information for identifying the component performing the virtualization process (discussed hereinbelow), and external volume connection module management information 254 which, when a real volume exists in an external storage 3, manages the identifier for the port for connection with the external storage 3. In FIG. 22, "Storage Control part #1" refers to the identification for the storage control part 7-1 in FIG. 19, and "Storage Control part #2" refers to the identification for the storage control part 7-2 in FIG. 19. In FIG. 22, Size (volume state information) and Status information are omitted here, but it is desirable to manage such information. In addition, since the internal storage configuration management information 507 contains detailed real volume management information concerning the internal storage 34, an explanation thereof is omitted here. In this embodiment, it is not necessary for each component of the virtualization controller 2 to hold and manage all information as elements of volume mapping information 515; rather, it is desirable for each component to hold and manage only information that it needs to carry out the task assigned to it.

FIG. 23 is a table showing an example of virtualization routing control information 530 which is managed by each component of the virtualization controller 2. The virtualization routing control information 530 is generated, referenced or updated when each component of the virtualization controller 2 performs the frame data transfer process as mentioned later. It has source management information 534 (which includes source identification and source-specified command identification) and destination management information 535 (which includes destination identification and self-specified command identification). The command identification is information which is added to individual frame data in order to identify which command is relevant to the frame data being transferred between the source and destination. Although a detailed explanation of the composition of frame data is not given here, frame data at least contains information for identifying the source (sender)/destination (receiver) of the frame data (source/destination identification), frame data type information, and header information including command identification, and payload information including access request information or status information or data. FIG. 23 suggests, as an example of virtualization routing control information 530 which is held and managed by the port section 8 (In Port) connected with the host computer 1, that the port section 8 has received three commands identified by Host_Tag.sub.—1, Host_Tag.sub.—2, and Host_Tag.sub.—3 from the host computer identified by Host_Pid.sub.—1 and respectively has added command identifiers InPort_Tag.sub.—1, InPort_Tag.sub.—2, and InPort_Tag.sub.—3 (which it has specified) to the commands and respectively has sent them to the storage control part 7-1 (SC#1 in FIG. 23), storage control part 7-2 (SC#2 in FIG. 23) and port section 8 (Out Port in FIG. 23).

Figure 24:
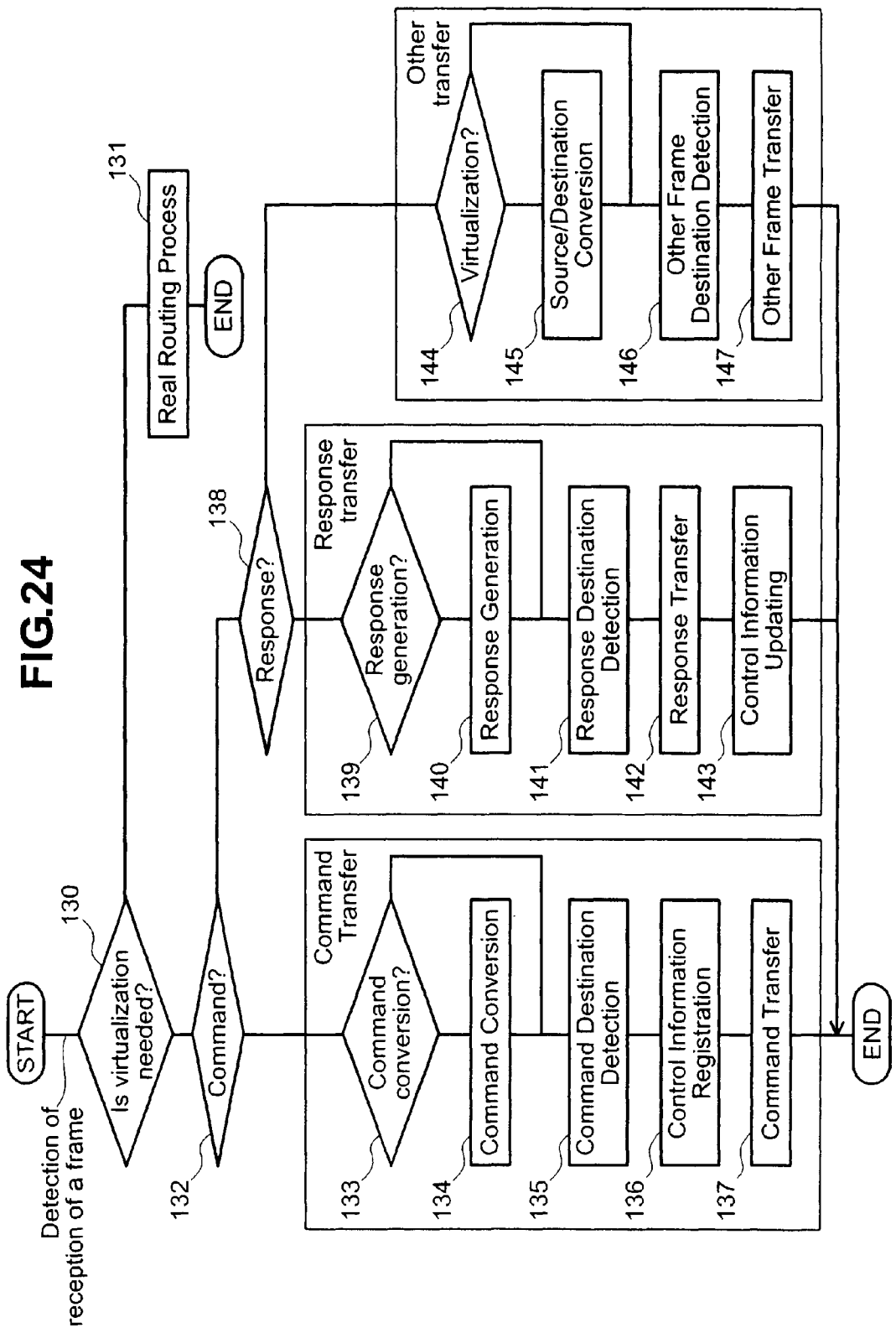
FIG. 24 shows an example of the frame data routing process according to the fourth embodiment.

FIG. 24 shows an example of the frame data transfer process which is performed by a component of the virtualization controller 2. This means that the process can be performed by a port section 8, the storage control part 7-1, or the storage control part 7-2. This process begins when frame data is received from the host computer 1 or internal storage 34 or external storage device 3, or when a component of the virtualization controller 2 receives frame data from another component. Next, the frame data transfer process according to this embodiment will be explained as an example, referring to FIG. 24. When a component of the virtualization controller 2 receives frame data, first of all it decides whether virtualization is needed or not (130) (discussed hereinbelow). The following is a concrete example of conditions of frame data which should be decided as needing virtualization.

(1) The destination identification in the frame data is registered in the virtual volume management information 520 of the volume mapping information 515.

(2) The source identification in the frame data is registered in the real volume management information 521 of the volume mapping information 515.

(3) The command identification in the frame data is registered in the source management information 534 or destination management information 535 of the virtualization routing control information 530.

The above conditions for decision on the necessity for virtualization are mere examples and do not limit the invention. The real routing process (131) which is to be performed if it is decided that virtualization is not needed is the same as the process shown in FIG. 9 and an explanation thereof is omitted here. Next, if it is decided that virtualization is needed, the component concerned detects the type of frame data using frame data type information included in the frame data.

Command Frame

If the received frame data is found to be a command frame (132), the command transfer program 531 takes the following steps for transfer of the command frame.

1. Decision on Necessity for Command Conversion (133)

Using the frame data destination identification included in the received frame data, and if necessary, various information included in the payload of the received frame data (destination LUN, etc.) and volume mapping information 515, the command transfer program 531 decides whether it should perform the after-mentioned command conversion process or not. For example, if the destination Port ID or LUN is registered in the virtual volume management information 520 of the volume mapping information 515, and the information for identifying it is registered in the virtualization module management information 523, then the program decides that the command needs conversion by it.

2. Command Conversion (134)

If the command transfer program 531 decides that command conversion by it is needed, it performs the command conversion process as follows: using the virtual volume management information 520 and real volume management information 521 of the volume mapping information 515, it replaces the destination identification included in the received frame data by identification corresponding to a real volume, and the source identification by its identification, and access request (command) information (LUN, etc) by access request information (LUN, etc) corresponding to a real volume. If it is decided at step 133 that command conversion is not needed, the step of command conversion (134) is not taken and the sequence proceeds to step 135.

3. Detection of Command Frame Destination (135)

If it is decided that command conversion is not needed, or after the above command conversion process is performed, the command transfer program 531 detects the destination to which the command frame is to be transferred, using the virtualization module management information 523 (for In Port), or the external volume connection module management information 524 (for the storage controller), or the real volume management information 521 (for Out Port) in the volume mapping information 515.

4. Registration of Virtualization Routing Control Information (136)

Next, the command transfer program 531 registers the source identification and command identification included in the received command frame, the destination identification for identifying the command frame destination, and the command identification generated by it, as the source management information 534 and destination management information 535 of the virtualization routing control information 530.

5. Command Transfer (137)

The command transfer program 531 replaces the command identification included in the received command frame by the command identification which it has generated and sends the latter to the above detected command frame destination (137). This concludes the whole command frame transfer process.

Response Frame

If the received frame data is found at step 132 to be not a command frame but a response frame (138), the response transfer program 532 takes the following steps for transfer of the response frame.

1. Decision on Necessity for Response Generation (139)

Using the command identification included in the received response frame and volume mapping information 515, the response transfer program 532 decides whether it should perform the response generation process or not. For example, if the source identification included in the received response frame is registered in the real volume management information 521 of the volume mapping information 515, and its identification is registered in the virtualization module management information 523, then it decides that the response frame is frame data which needs response generation by it.

2. Response Generation (140)

If the response transfer program 532 decides that response generation is needed, it performs the response generation process as follows: using the virtual volume management information 520 of the volume mapping information 515, it replaces the source identification included in the received response frame by identification corresponding to a virtual volume, and the destination identification by identification for the corresponding host computer, and if necessary, generates new status information according to the status information included in the received response frame and replaces the old status information by the new one.

3. Detection of Response Frame Destination (141)

Then, the response transfer program 532 detects the destination to which the response frame is to be transferred, using the command identification included in the received frame data and the virtualization routing control information 530. For example, it detects the command management information in the destination management information 535 of the virtualization routing control information 530 which agrees with the command identification included in the received frame data and recognizes the source identification in the source management information 534 corresponding to the command management information, as representing the destination for the response frame.

4. Response Transfer (142)

Next, the response transfer program 532 replaces the command identification included in the received response frame by the corresponding source command identification in the source management information 534 of the virtualization routing control information 530, and sends it to the response frame destination detected at step 141.

5. Updating the Virtualization Routing Control Information (143)

Then, the response transfer program 532 deletes the corresponding entry (destination/source management information) in the virtualization routing control information 530 according to the command identification included in the received response frame and concludes the whole response frame transfer process.

Other Frame

If the received frame data is found to be a frame (e.g., data) other than a command frame and a response frame, the other transfer program 533 takes the following steps for transfer of the frame data.

1. Decision on Necessity for Virtualization (144)

Using the frame data destination/source identification and command identification included in the received frame data, volume mapping information 515 and virtualization routing control information 530, the other transfer program 533 decides whether it should perform the virtualization process or not. For example, if the destination or source identification is registered in the real volume management information 521 or virtual volume management information 520 of the volume mapping information 515, and its identification is registered in the virtualization module management information 523, then the other transfer program 533 decides that it is frame data which needs virtualization by it.

2. Virtualization (Source/Destination Identification Conversion) (145)

If the other transfer program 533 decides that virtualization by it (source/destination identification conversion) is needed, it performs the virtualization process as follows: using the virtual volume management information 520 and real volume management information 521 of the volume mapping information 515, it replaces the source or destination identification included in the received frame data by virtual or real volume identification information. For example, if the destination identification included in the received frame data agrees with virtual volume identification information (from a host computer to the virtualization controller), the other transfer program 533 replaces the destination identification by real volume identification information; or if the source identification included in the received frame data agrees with real volume identification information (from the virtualization controller to a host computer), it replaces the source identification by virtual volume identification information.

3. Detection of Other Frame Data Destination (146)

Then, the other transfer program 533 detects the destination to which the frame data is to be transferred, using the command identification included in the received frame data and the virtualization routing control information 530. For example, the other transfer program 533 detects the command management information in the source management information 534 of the virtualization routing control information 530 which agrees with the command identification included in the received frame data and recognizes the destination identification in the destination management information 535 corresponding to the command management information, as representing the destination for the frame data.

4. Transfer of Frame Data (147)

Next, the other transfer program 533 replaces the command identification included in the received frame data by the corresponding source command identification in the source management information 534 of the virtualization routing control information 530, and sends it to the frame data destination detected at step 156.

For simplification, the above explanation assumes that the external port identification (which is used with a host computer or storage device) is the same as the internal one (which is used with another internal component of the virtualization controller). However, the present invention is not limited thereto. When the internal and external port identifications are different, it may be sufficient for the virtualization controller 2 to have information which defines the relation between them.

Next, an explanation will be given of the data transfer process in this embodiment where different access paths between a host computer and a storage device offering a real volume are available. In this embodiment, a port section 8 or the storage control part 7-1 or storage control part 7-2 performs the data transfer process and, upon completion of data transfer, updates the volume mapping information 515. Which component is to perform this process is determined according to the virtualization module management information 523 of the volume mapping information 515. In other words, the component registered as a virtualization module in the virtualization module management information 523 performs the data transfer process for the corresponding virtual volume and updates the volume mapping information 515. For example, if the volume mapping information 515 is as shown in FIG. 22, the storage control part 7-2 performs the data transfer process for the virtual volume identified by Port ID=V_Pid.sub.—2, Port Name=V_Pname.sub.—2, LUN=0 and updates the volume mapping table. The sequences for data transfer and volume mapping table updating are the same as in the first embodiment.

In this embodiment, the virtualization module may be changed. Next is an explanation of a data transfer process involving change of the virtualization module. A data transfer process involving change of the virtualization module is classified into two cases: in one case, the access path type (first, second or third access path) is changed; and in the other case, the access path is constant but the virtualization module is changed. The following is an explanation of a case that the access path is changed from the second access path type to the third one.

FIG. 25 shows an example of volume mapping information 515 which is held by the port section 8 (In Port) of the virtualization controller 2 before the data transfer process; FIG. 26 shows an example of volume mapping information 515 which is held by the storage control part 7-2 before the data transfer process; and FIG. 27 shows an example of real volume mapping information 515 which is held by the port section 8 (Out Port) of the virtualization controller 2 before the data transfer process.

As shown in FIG. 25, V_Pid.sub.—1, V_Pid.sub.—2, and V_Pid.sub.—3 are registered as virtual volume management information managed by the port section 8 (In Port). This indicates that the port section 8 (In Port) constitutes an access path for three virtual volumes (V_Pid.sub.—1, V_Pid.sub.—2, and V_Pid.sub.—3) which the virtualization controller 2 offers to the host computer. Likewise, FIG. 26 indicates that the storage control part 7-2 constitutes an access path for the virtual volume V_Pid.sub.—2; and FIG. 27 indicates that the port section 8 (Out Port) constitutes an access path for two virtual volumes (V_Pid.sub.—2 and V_Pid.sub.—3). In addition, the virtualization module management information in FIGS. 25, 26 and 27 indicates that the storage control part 7-1 (SC#1), storage control part 7-2 (SC#2), and Out Port perform virtualization of the virtual volumes identified by V_Pid.sub.—1, V_Pid.sub.—2, and V_Pid.sub.—3, respectively.

Therefore, the access path between the virtual volume V_Pid.sub.—1 and the host is of the first type, namely a path which leads from In Port through the backplane 9 to the storage control part 7-1 in which virtualization is performed. The access path between the virtual volume V_Pid.sub.—2 and the host is of the second type, namely a path which leads from In Port through the backplane 9 to the storage control part 7-2 in which virtualization is performed, and then (after virtualization) leads through Out Port and reaches an external storage. The access path between the virtual volume V_Pid.sub.—3 and the host is of the third type, namely a path which leads from In Port through the backplane 9 to Out Port 7-1 in which virtualization is performed, skipping the storage control parts.

FIGS. 28 to 30 show examples of volume mapping information 515 which are respectively held by the port section 8 (In Port), storage control part 7-2, and port section 8 (Out Port) after the access path to the virtual volume (V_Pid.sub.—2) shown in FIGS. 25 to 27 has been changed from the second type to the third type and data transfer between external storages 3 (data transfer from the real volume identified by P_Pid.sub.—2 and LUN 0 to the real volume identified by P_Pid.sub.—3 and LUN 1) has been made.

FIG. 28 and FIG. 30 respectively show volume mapping information which is held by the port section 8 (In Port) and the port section 8 (Out Port) respectively. As indicated by FIG. 28 and FIG. 30, the identification for the real volume corresponding to the virtual volume identified by V_Pid.sub.—2 is replaced by P_Pid.sub.—3, P_Pname.sub.—3, LUN 1, which is destination real volume identification, and the virtualization module management information is replaced by "Out Port" which represents the port section to perform virtualization in the new access path (third type access path). FIG. 29 shows volume mapping information which is held by the storage control part 7-2. In the third type access path, the storage control part does not constitute an access path which is used to offer a virtual volume to the host computer. Therefore, the entry for the virtual volume identified by V_Pid.sub.—2 is deleted here.

A detailed explanation of the data transfer process according to this embodiment is omitted because the process is achieved when an adequate component of the virtualization controller 2 (for example, a component which performs virtualization before data transfer) follows the abovementioned data transfer process according to the above (first to third) embodiments.

It is desirable that volume mapping information 515 should be updated by the components of the virtualization controller 2 synchronously. Therefore, it is desirable that as in the above embodiments, its updating should be made through the main control part 20 of the virtualization controller 2 upon completion of data transfer between storages. In other words, it is desirable that a component which performs the process for data transfer between storages should notify the main control part 20 of completion of data transfer and the main control part 20 thus notified should update the relevant volume mapping information 515. The same applies to the procedure for updating volume mapping information 515 in a case that only the access path is changed and data transfer between storages is not made.

The above explanation assumes that the port section (In Port) connected with the host computer 1 and the port section (Out Port) connected with an external storage 3 are different port sections. However, the present invention is not limited thereto. It is also possible, for example, that a port section 8 is connected with a host computer 1 and an external storage 3 at the same time. Furthermore, the above explanation assumes that Port ID and Port Name as information for identifying a virtual volume are identifiers assigned to a virtual port offered to the host computer 1 by the virtualization controller 2. However, the invention is not limited thereto. According to this embodiment in particular, the actual identifiers assigned to port sections 8 of the virtualization controller 2 may be used as virtual volume management information.

According to the present invention, data can be transferred between storage devices without revising the identification information which a host computer uses to identify the volume to be accessed. As a consequence, data transfer takes place without stopping operation of the host computer.

Furthermore, according to the present invention, even when a virtualization controller is newly introduced or replaced in a computer system, a host computer can access data without revising the information for identifying the volume to be accessed. As a consequence, it is possible to introduce or replace a virtualization controller in the computer system without stopping operation of the host computer.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims along with their full scope of equivalents.

What is claimed is:

1. A virtualization system comprising:
a plurality of sections, each section of the plurality of sections including a processing circuit,
wherein a first section of the plurality of sections is configured to store first mapping information, and a second section of the plurality of sections is configured to store second mapping information, each of the first and second mapping information including a relationship between first volume identification information, which is used by a computer system to access a virtual volume in the virtualization system, and second volume identification information for identifying a first logical volume of a first storage device, the first storage device having a first disk controller and a plurality of first disk drives related to the first logical volume, the relationship being used for transferring data, which is sent from the computer system and is related to the first volume identification information, to the first logical volume,
wherein the virtualization system receives the data, which is sent from the computer system and is related to the first volume identification information, during a data transfer phase in which data stored in the first logical volume is transferred to a second logical volume of a second storage device, the second storage device having a second disk controller and a plurality of second disk drives related to the second logical volume, and wherein the data received during the data transfer phase is adapted to be written to the second logical volume,
wherein the virtualization system changes the relationship and transfers the data, which is sent from the computer system and is related to the first volume identification information, to the second logical volume, the changed relationship relating the first volume identification information to third volume identification information for identifying the second logical volume, and
wherein the plurality of sections are a plurality of port sections comprising the processing circuit and an interface control part, the interface control part being configured to be coupled to at least one of the computer system and the first and second storage devices.

2. The virtualization system according to claim 1, wherein the first and second mapping information are changed based on the data transfer phase.

3. The virtualization system according to claim 1, wherein the first section is a first port section comprising a first interface control part, the first interface control part being configured to be coupled to at least one of the computer system and the first and second storage devices.

4. The virtualization system according to claim 3, wherein the second section is a second port section comprising a second interface control part, the second interface control part being configured to be coupled to at least one of the computer system and the first and second storage devices.

5. The virtualization system according to claim 1, wherein the volume identification information corresponds to a Logical Unit Number (LUN).

6. The virtualization system according to claim 1, wherein the data received during the data transfer phase is adapted to be written to the first logical volume and the second logical volume.

7. A data transfer method of a virtualization system comprising a plurality of sections, each section of the plurality of sections including a processing circuit, the data transfer method comprising:

storing first mapping information in a first section of the plurality of sections;

storing second mapping information in a second section of the plurality of sections, each of the first and second mapping information including a relationship between first volume identification information, which is used by a computer system to access a virtual volume in the virtualization system, and second volume identification information for identifying a first logical volume of a first storage device, the first storage device having a first disk controller and a plurality of first disk drives related to the first logical volume;

transferring data, which is sent from the computer system and is related to the first volume identification information, to the first logical volume based on the relationship;

receiving the data, which is sent from the computer system and is related to the first volume identification information, during a data transfer phase in which data stored in the first logical volume is transferred to a second logical volume of a second storage device, the second storage device having a second disk controller and a plurality of second disk drives related to the second logical volume, and wherein the data received during the data transfer phase is adapted to be written to the second logical volume; and changing the relationship and transferring the data, which is sent from the computer system and is related to the first volume identification information, to the second logical volume, the changed relationship relating the first volume identification information to third volume identification information for identifying the second logical volume, wherein the plurality of sections is a plurality of port sections comprising the processing circuit and an interface control part, the interface control part being configured to be coupled to at least one of the computer system and the first and second storage devices.

8. The data transfer method according to claim 7, wherein the first and second mapping information are changed based on the data transfer phase.

9. The data transfer method according to claim 7, wherein the first section is a first port section comprising a first interface control part, the first interface control part being configured to be coupled to at least one of the computer system and the first and second storage devices.

10. The data transfer method according to claim 9, wherein the second section is a second port section comprising a second interface control part, the second interface control part being configured to be coupled to at least one of the computer system and the first and second storage devices.

11. The data transfer method according to claim 7, wherein wherein the volume identification information corresponds to a Logical Unit Number (LUN).

12. The data transfer method according to claim 7, wherein the data received during the data transfer phase is adapted to be written to the first logical volume and the second logical volume.

13. A computer program product stored in a computer readable storage medium and executable by a virtualization system including a plurality of sections, each section of the plurality of sections including a processing circuit, the computer program product comprising:

a code for storing first mapping information in a first section of the plurality of sections;

a code for storing second mapping information in a second section of the plurality of sections, each of the first and second mapping information including a relationship between first volume identification information, which is used by a computer system to access a virtual volume in the virtualization system, and second volume identification information for identifying a first logical volume of a first storage device, the first storage device having a first disk controller and a plurality of first disk drives related to the first logical volume;

a code for transferring data, which is sent from the computer system and is related to the first volume identification information, to the first logical volume based on the relationship;

a code for receiving the data, which is sent from the computer system and is related to the first volume identification information, during a data transfer phase in which data stored in the first logical volume is transferred to a second logical volume of a second storage device, the second storage device having a second disk controller and a plurality of second disk drives related to the second logical volume, and wherein the data received during the data transfer phase is adapted to be written to the second logical volume; and a code for changing the relationship and transferring the data, which is sent from the computer system and is related to the first volume identification information, to the second logical volume, the changed relationship relating the first volume identification information to third volume identification information for identifying the second logical volume, wherein the plurality of sections is a plurality of port sections comprising the processing circuit and an interface control part, the interface control part being configured to be coupled to at least one of the computer system and the first and second storage devices.

14. The computer program product according to claim 13, wherein
the first and second mapping information are changed based on the data transfer phase.

15. The computer program product according to claim 13, wherein
the first section is a first port section comprising a first interface control part, the first interface control part being configured to be coupled to at least one of the computer system and the first and second storage devices.

16. The computer program product according to claim 15, wherein
the second section is a second port section comprising a second interface control part, the second interface control part being configured to be coupled to at least one of the computer system and the first and second storage devices.

17. The computer program product according to claim 13, wherein
wherein the volume identification information corresponds to a Logical Unit Number (LUN).

18. The computer program product according to claim 13, wherein
the data received during the data transfer phase is adapted to be written to the first logical volume and the second logical volume.

* * * * *